May 30, 1961 — A. G. THOMAS — 2,986,333
PORTABLE ELECTRONIC COMPUTER
Filed June 8, 1955 — 8 Sheets-Sheet 1

INVENTOR.
Albert G. Thomas

May 30, 1961 A. G. THOMAS 2,986,333
PORTABLE ELECTRONIC COMPUTER
Filed June 8, 1955 8 Sheets-Sheet 2
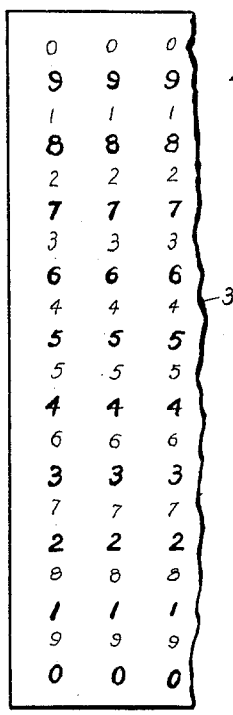
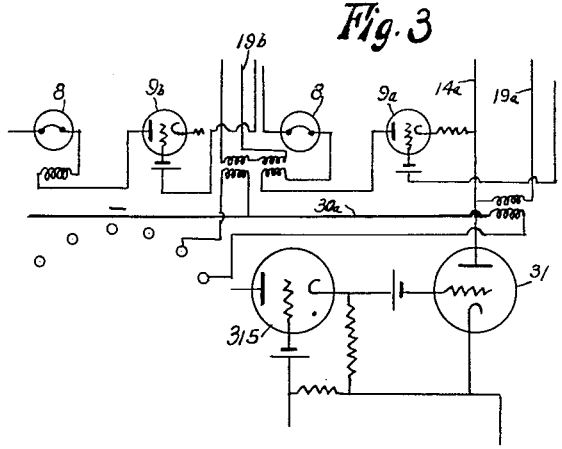
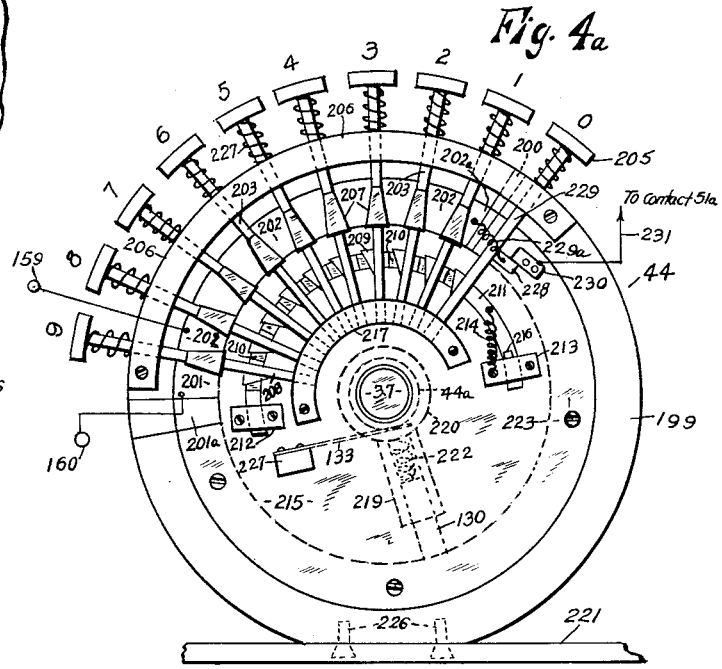
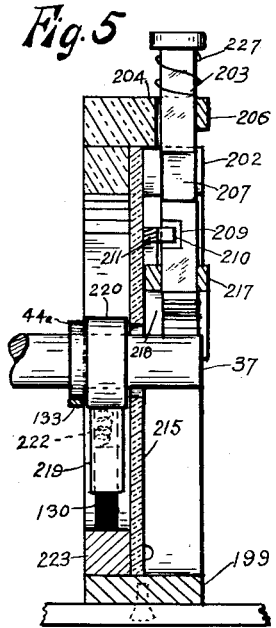
*Albert G. Thomas* INVENTOR.

INVENTOR.
Albert G. Thomas

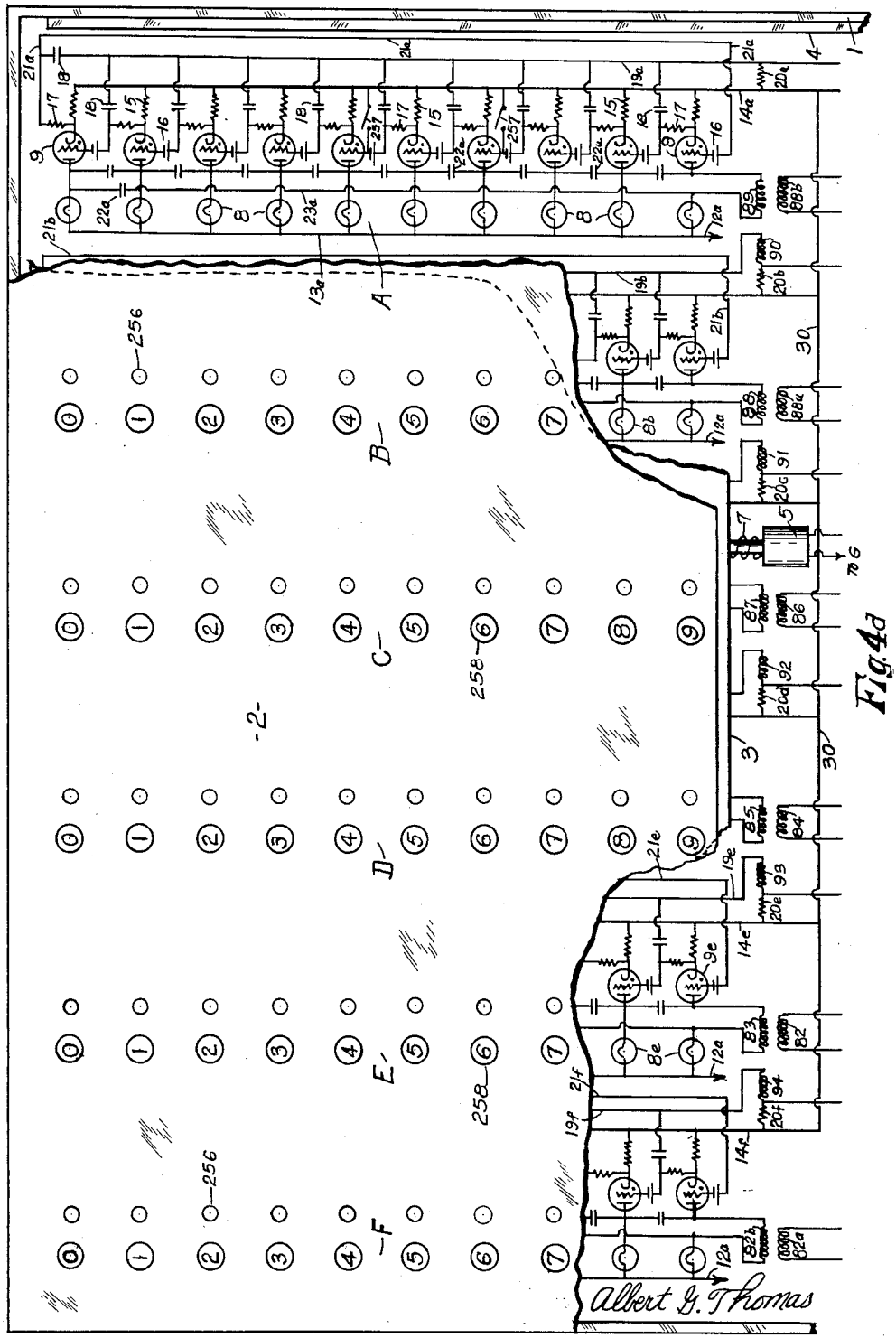

May 30, 1961
A. G. THOMAS
2,986,333
PORTABLE ELECTRONIC COMPUTER
Filed June 8, 1955
8 Sheets-Sheet 7
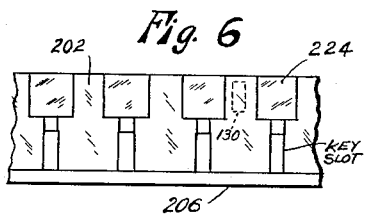
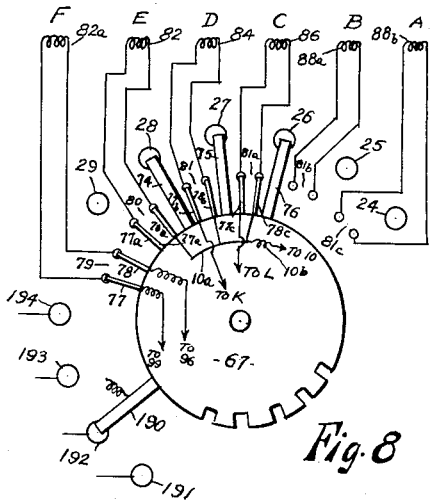
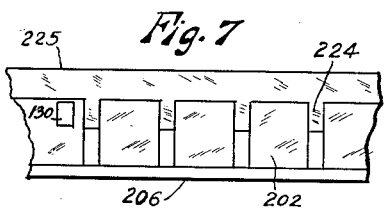
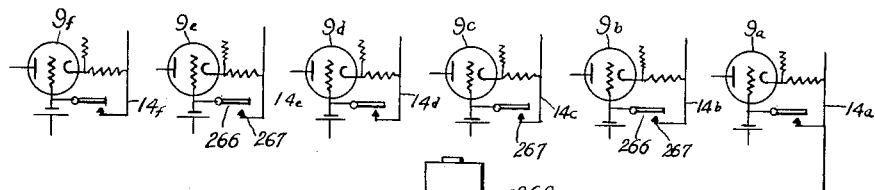
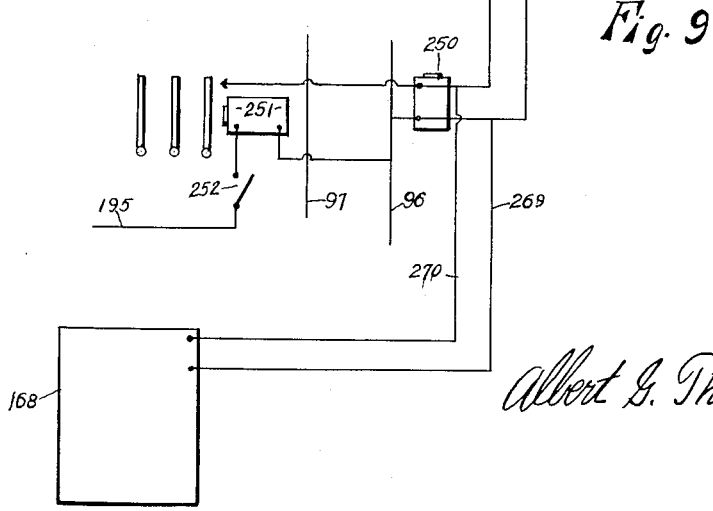
Albert G. Thomas INVENTOR.

May 30, 1961 A. G. THOMAS 2,986,333
PORTABLE ELECTRONIC COMPUTER
Filed June 8, 1955 8 Sheets-Sheet 8
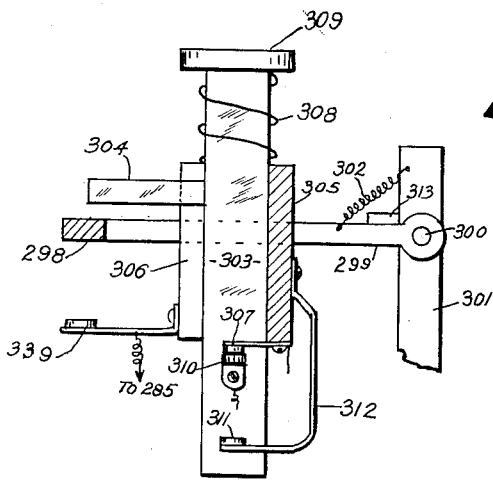
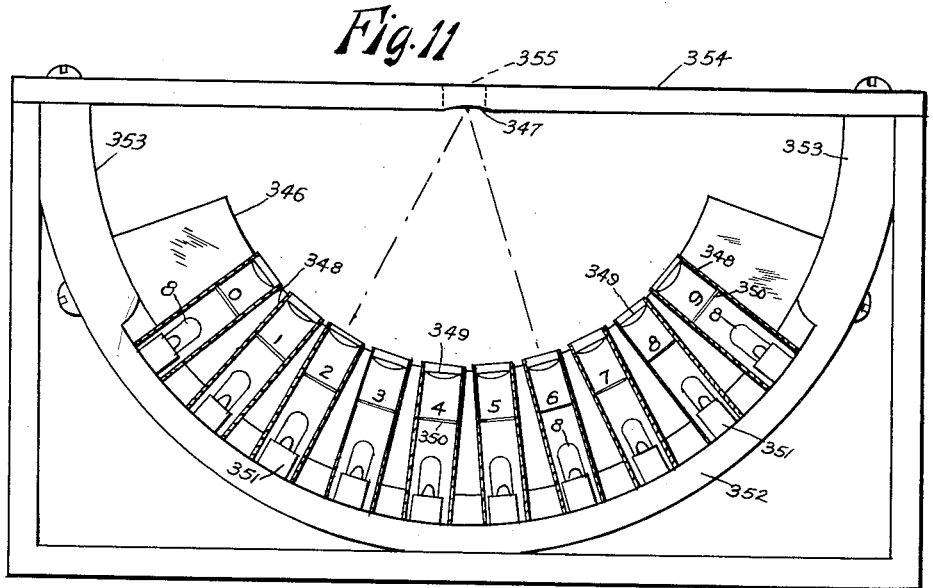
Albert G. Thomas INVENTOR.

United States Patent Office 2,986,333
Patented May 30, 1961

2,986,333
PORTABLE ELECTRONIC COMPUTER
Albert G. Thomas, Chattanooga, Tenn.
(133 Bollingwood Road, Charlottesville, Va.)
Filed June 8, 1955, Ser. No. 513,973
55 Claims. (Cl. 235—160)

This invention relates to calculating machines or computers and is particularly directed to an electronic calculator for quickly performing multiplication, division, addition, and subtraction.

In prior calculators of electronic type there has been much complication and a number of units of elaborate and expensive construction have been included. It is therefore an object of the present invention to provide a relatively simple calculating device which is reliable in operation and which can be sold at moderate cost.

Another object is to provide a calculating machine which is easy to operate and which furnishes desired answers quickly.

A further object is to provide a calculator or computer in which division is to a large extent automatic.

An additional object is to provide a computer in which the number to be divided and the divisor can be readily set in the machine.

A still further object is the provision of a calculator which can be quickly set for multiplication or for division.

Another object is the provision of an electronic calculator which is readily settable for performing multiplication, division, addition, or subtraction.

A further object is to provide a calculator in which numerals indicating a number are in alignment.

An additional object is to provide a suitable electronic counting tube for a calculator.

Other objects will be evident in the following description.

In the drawings:

Figure 2 is a fragmentary plan view of a numeral sheet which is slidably mounted for bringing either of two sets of numerals into register with windows in the cover.

Figure 3 is a fragmentary circuit diagram showing transformers for pulsing thyratron circuits instead of resistors.

Figure 4a is an elevation, as seen from the right, of one of the multiplicand key units of Figure 1.

Figure 4d is an enlargement of the upper counting circuit portion of Figure 1.

Figure 5 is a part sectional elevation as seen from the front, of the key unit of Figure 4a.

Figure 6 is a fragmentary plan view of a type of construction of the contacts in the unit of Figure 4a.

Figure 7 is a fragmentary plan view showing an alternative construction for contacts of the unit shown in Figure 4a.

Figure 8 is a fragmentary view showing the switch arms of Figure 1 in a position for starting the process of division.

Figure 9 is a fragmentary circuit diagram showing a circuit for firing the starting tubes of the numeral units and the divisor unit.

Figure 10 is a part sectional elevation of a multiplier key and associated parts shown in Figure 1.

Figure 11 is a part sectional side elevation of a plurality of numeral indicating tubes arranged to direct numeral images to one window.

Figure 1:
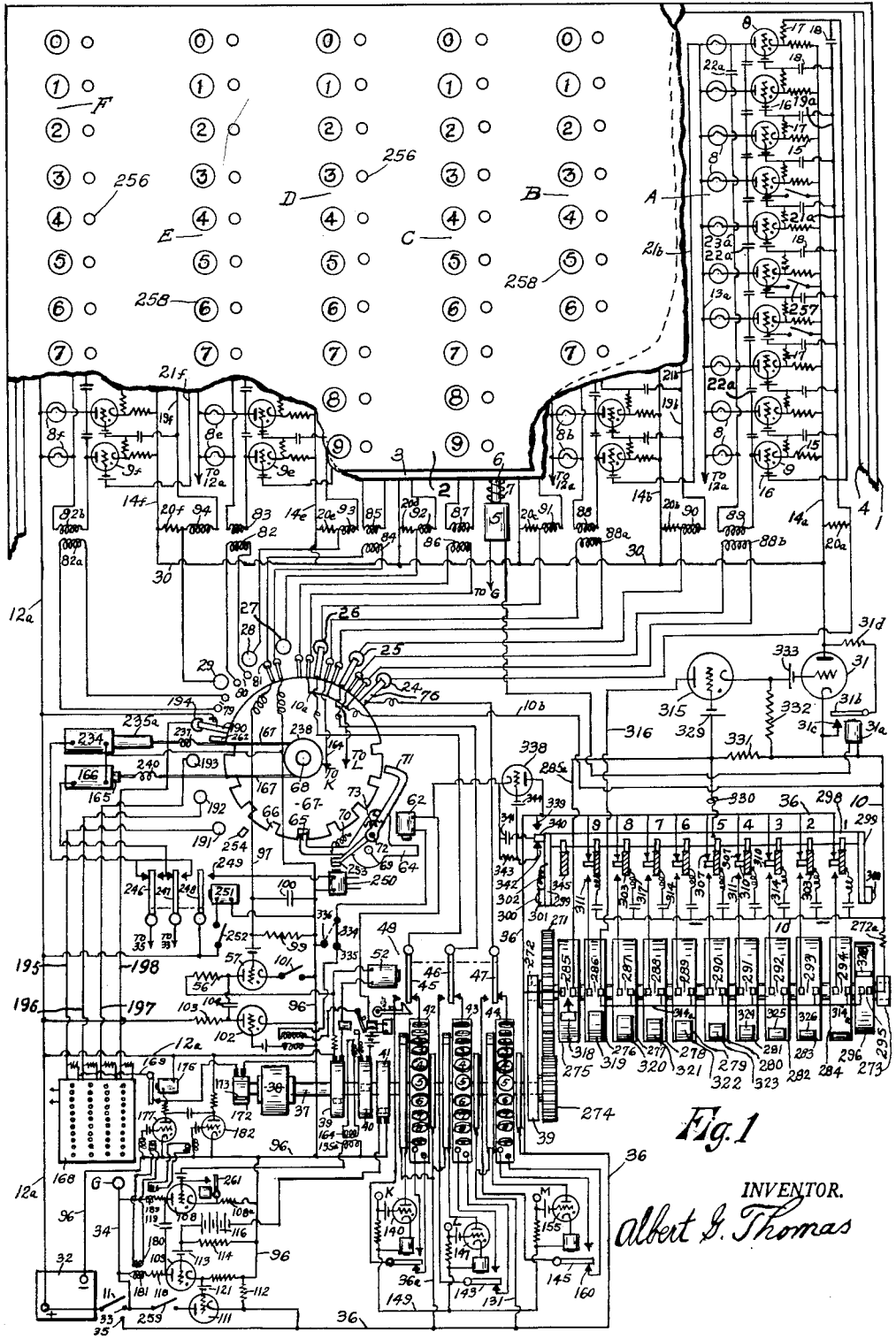
Figure 1 is a top plan view of an electronic calculator showing the cover partly broken away to reveal electrical circuits and components.

In Figure 1, casing 1 is shown in fragmentary manner, with cover 2 partly broken away to reveal circuits and electronic components. There are a plurality of rows of windows in the cover, A (broken away), B, C, D, E, F. These windows may comprise holes in the cover or they may be made of clear plastic or the like. Beneath cover 2 and closely adjacent thereto is transparent slidable plate or sheet 3 which is mounted on track 4 and on a similar track on the opposite side of the casing so that the sheet may be moved back and forth over a short distance in direction parallel with the rows of windows. Solenoid 5 is fastened to the frame of the machine and its armature 6 is fastened to sheet 3. Compression spring 7, surrounding plunger 6, normally holds the sheet in its rearward position with numerals from 0 to 9 printed on the sheet in register with the windows of each row as indicated by the heavy numerals of Figure 2. These numerals ordinarily are not markedly visible but are quite visible when illuminated from beneath by respective lamps 8 which may be of filament type, but gaseous lamps could be used with proper circuit components. It is possible also to place thyratrons 9 beneath the windows so that the light from the thyratrons will illuminate the numerals, when the thyratrons are fired.

Sheet 3 may be made of transparent or translucent plastic or may comprise plastic in a metal frame. Furthermore the sheet may be of metal with holes filled or covered with transparent plastic having numerals printed thereon; or the holes in the metal may be punched out in shapes of numerals so that the numerals will appear as illuminated windows above lamps which may be supplied current. Sheet 3 may be placed sufficiently below cover 2 that the numerals are not very visible unless a lamp beneath is illuminated, or the holes in cover 2 may be covered with ground glass or translucent plastic so the numerals are not visible at all until illumination from the lamps strikes the translucent covering.

The sheet 3 has also another set of numerals for each row, from 0 to 9 running in opposite direction and in line with the numerals shown. These numerals are placed between the ones indicated and are in reversed order as shown in fragmentary Figure 2. The heavier numerals reading from 0 to 9 are for multiplaction and addition, and the fine line numerals reading from 0 to 9 in opposite direction are for division and subtraction. One terminal of solenoid 5 is connected with negative line 10 of a rectifier, battery, dynamo, or other suitable source of direct current 32, and the other terminal of this solenoid is connected with terminal G which is connected to a terminal of switch 11 the other terminal of which is connected to positive line 12 of the direct current source 32. When, therefore, switch 11 is closed, for division, solenoid 5 is energized and plunger 6 is pulled into the solenoid for its full travel, thereby bringing the fine line numerals for division into register with the windows in cover 2. In connection with Figure 1 it should be remembered that the numerals shown in rows A, B, C, D, E, F are for division.

There are ten thyratrons 9 for each row of lamps 8. The lamps of row A are connected between positive bus bar 13$_a$ and the respective anodes of the thyratrons the cathodes of which are connected with negative bus bar $14_a$ through respective resistors 15. The negative poles of batteries or other bias sources 16 are connected to the respective thyratron grids and the positive poles of these sources are connected to the cathode-connected ends of resistors 15, through potential-dropping resistors 17. One terminal of each of pulsing capacitors 18 is connected to conductor $19_a$ and the other terminals of these condensers are connected to the positive poles of bias sources 16 and to resistors 17 as shown. It will be observed that, due to the connection of each thyratron cathode with the grid of the thyratron just ahead of it in the counting circuit, the grid of a tube just ahead of a fired thyratron will be biased less negatively than the other thyratrons by a voltage equal to the potential drop across the resistor 15 of the fired thyratron. Therefore if pulses of current or voltage are applied to all capacitors 18 simultaneously, only the less negatively biased tube will be fired if the pulse is of proper amplitude, and duration. These pulses may be applied across or through resistors $20_a$, $20_b$, $20_c$, $20_d$, $20_e$ and $20_f$. Each of these resistors is connected in manner similar to that of resistor $20_a$ which is connected between negative conductor $14_a$ and conductor $19_a$. The cathode of the last or number "9" tube as indicated by the heavy numerals in Figure 2 is connected to the bias source 16 of the next succeeding or "0" tube by means of conductor $21_a$. The anodes of the thyratrons are electrically connected by quenching condensers $22_a$ so that when any tube of a row is fired any other fired tube of that row will be extinguished. The anode of tube "9" is connected with the anode of the "0" tube by means of a condenser $22_a$ and conductor $23_a$. The ten thyratrons of each row are connected as described for those of row A. Similar numerals represent similar components, the small letter subscripts indicating the row.

Switch contacts 24, 25, 26, 27, 28, and 29 are connected to the positive ends of respective resistors $20_a$, $20_b$, $20_c$, $20_d$, $20_e$, and $20_f$. The negative ends of all of these resistors are connected to conductor $14_a$ by means of conductor 30. While resistors are described it is obvious that transformers can be used in place of resistors. In that case the secondary windings of the transformers would be connected between the lines 14 and 19, one terminal of each primary winding being connected to one of the switch contacts and the other primary terminals being connected to common negative line 30 or to another negative line $30_a$ as shown in Figure 3, if a separate power supply is desired for the pulsing circuit. In that case the positive terminal of this power supply can be connected to line 12 and the negative terminal to line $30_a$.

Referring to the construction of Figure 1, the negative conductors $14_a$, $14_b$, $14_c$, $14_d$, $14_e$, and $14_f$ for the various rows of thyratrons are connected to conductor 30 which is connected to the anode of electronic tube 31 the cathode of which is connected to negative line 10 which is connected to the negative terminal of direct current power source 32 which may be a generator, rectifier, battery, or the like. The positive terminal of the source 32 is connected to the blade of single pole, double throw switch 11 having one contact 33 connected to conductor 34, for division, and having contact 35 connected to conductor 36 for multiplication.

Shaft 37 of motor 38 is supported by the motor bearings and by bearing plate 39 attached to the base or frame of the machine. Other bearings may be provided and the shaft may be flexibly connected to the motor shaft. The shaft 37 carries switch or contact discs 39, 40, and 41 which are made of suitable insulating material like Bakelite, polystyrene, or other plastics or the like. These discs have respective metal contact or switch elements $39_a$, $40_a$, and $41_a$ flush with their peripheral surfaces and positioned as described later. The discs are fixed to the shaft 37 to which are also fixed slip rings $42_a$, $43_a$, and $44_a$ (see Figure 4b) associated with respective multiplicand or divisor key groups 42, 43, and 44 which are fixed to the machine. Electrical contacts of the key groups are fixed and a rotary brush or contactor for each group is fixed to shaft 37, insulated therefrom and rotates with it. The construction of the keys and contactors will be described in connection with Figure 4a.

The end contacts of key groups 42, 43, and 44 are connected, respectively, with contacts $49_a$, $50_a$, and $51_a$ normally touching arms or armatures 45, 46, and 47 of relay 48 the winding of which causes all three arms to be simultaneously pulled against respective contacts 49, 50 and 51 when relay winding 52 is energized. When this happens spring-urged pivoted hook 53 latches arm 45 or another movable part so that all three arms 45, 46, and 47 are held in contact with respective contact elements 49, 50, and 51. The two brushes 54 are in contact with the periphery of insulating disc 39 and the two brushes 55 are in contact with the periphery of insulating disc 40. One brush 54 is connected to the positive terminal of direct current source 32 by means of conductor $12_a$ and the other brush of this pair is connected through relay coil 263 to a terminal of relay winding 52 the other terminal of which is connected by wire 59 to an end of resistor 56 which leads to the anode of thyratron 57. Resistor 58 is connected between conductors 59 and $12_a$.

One of the brushes 55 is connected through transformer primary 162 and relay arm 264 to an end of primary winding 60 of transformer $T_1$ and the other end of this winding is connected to the positive terminal of battery or other direct current source 61 through series-connected coils or electromagnets 62, $63_a$ and 63. When these coils or magnets are energized simultaneously steel latch 53 is pulled toward magnet 63 thereby releasing relay armatures 45, 46, and 47 so that a suitable spring $47_a$ will pull them back against their respective contacts as shown, if coil 52 is not energized. Simultaneously, magnet 62 will pull arm 64 of steel pawl 65 so that the pawl will be pulled out of one of the notches 66 in the periphery of plastic or other insulating disc 67 which is rotatable around stub shaft 68 fastened to the frame of the machine. Pawl or latch 65 is pivoted to the machine framework at 69 and is normally pulled toward disc 67 by means of tension spring 70 fastened to the pawl and to the frame. Another pawl 71 is pivoted at 72 to the structure of pawl 65 and is normally pulled against stop 73 on the pawl by means of the spring shown fastened to pawl 71 and to the structure of pawl 65. Normally, pawl 71 is out of contact with notched disc 67 but is yieldingly forces against the periphery of disc 67 when coil 62 is energized to cause movement of pawl 65 out of one of the notches 66. These notches may be continued around so that pawl 71 will engage a notch just before pawl 65 is moved out of a notch. This escapement allows disc 67 to be rotated only one notch at a time. Pawl 71 is located between the notches 66 when pawl 65 is in mesh with a notch. The other brush 55 is connected to the negative terminal of direct current source 61.

Insulating disc 67 has attached or imbedded radially directed resilient metal switch blades 74, 75, and 76 shown in contact with contact buttons 26, 25, and 24, respectively. Shorter resilient metal switch blades 77 and 78, are also attached to disc 67 and are adapted to make contact with the pairs of contact buttons 79, 80, or 81 sequentially as disc 67 is moved in steps from its proper left position (for division) to its extreme right position as shown.

Resilient switch blades $77_a$ and $78_a$ are likewise attached to disc 67, and in the extreme right position shown, are in electrical connection with pair of contacts $81_a$ connected with transformer secondly winding 86 which is associated with primary winding 87. Similarly, resilient switch blades $77_b$ and $78_b$ are fastened to disc 67 and are touching pair of contacts $81_b$ connected to transformer secondary winding $88_a$ when disc 67 is in its full right position as indicated. Secondary winding $88_a$ is associated with primary winding 88. Switch blades 78$_a$, 78$_b$, and 78$_c$ are electrically connected by wire 10$_a$ so that each of these switch elements is connected to negative line 10$_b$ and 10 to negative line 96. Switch arms 77$_c$ and 78$_c$ are connected with transformer secondary 88$_b$ through contacts 81$_c$. Winding 88$_b$ is associated with primary winding 89. The contact buttons are fastened to a suitable insulating plate which may be part of the frame or attached thereto. The pair of contacts 79 are connected to secondary winding 82$_a$ which is associated with transformer primary winding 82$_b$ which is in series with the zero lamp 8$_f$, as indicated for multiplication. The other terminal of primary winding 82$_b$ is connected with the zero thyratron 9$_f$; considering that the numerals in the windows are set for multiplication. Similarly, the pair of contacts 80 are connected with the terminals of secondary winding 82 associated with transformer primary winding 83 which is connected in series with the zero lamp and associated thyratron in the E row in the same manner as described for winding 82$_b$. The pair of contact buttons 81 are similarly connected with transformer secondary winding 84 which is associated with similarly connected primary winding 85 of row D.

Transformer primary windings 89 and 88, for rows A and B are connected in a similar manner as transformer primary windings 82$_b$, 83, and 85. Transformer secondary windings 90, 91, 92, 93 and 94, connected in series with respective resistors 20$_b$, 20$_c$, 20$_d$, 20$_e$, and 20$_f$ are inductively associated with respective primary windings 89, 88, 87, 85, and 83. The resistor-secondary combinations 20$_b$–90, 20$_c$–91, 20$_d$–92, 20$_e$–93 and 20$_f$–94 are connected, respectively, between bus lines or conductors 19$_b$ and 14$_b$, and similar lines for the other rows, including lines 19$_e$ and 14$_e$, and lines 19$_f$ and 14$_f$. The transformer primaries 82$_b$, 83, and 85 have additional inductively associated secondary windings 82$_a$, 82, and 84, as described.

The switch arms or blades 77 and 78 are connected, respectively, with the positive terminal of battery or other bias potential source 95 and negative line 96, by means of flexible conductors 97 and 98. The negative terminal of bias source 95 is connected to the grid of thyratron 57, and resistor 99 and condenser 100 are connected in parallel between the positive terminal of bias source 95, and negative line 96 to which the cathode of thyratron 57 may be connected by means of switch 101.

Switch blade 77 is connected by flexible conductor 97 to the junction of battery 95 and resistor 99. Similarly, switch blade 78 is connected to negative line 96 by means of flexible conductor 98. Switch blade 77$_b$ is, by means of flexible conductor 164, connected with terminal L which is connected to the positive pole of the grid bias battery of thyratron 147. The cathode of thyratron 102 is connected to line 96 and the associated anode of tube 102 is connected through resistor 103 to the positive terminal of direct current power supply 32 by means of conductor 12$_a$. Quenching condenser 104 is connected between the anodes of tubes 57 and 102 to cause the extinction of one tube when the other is fired. Thyratron 102 is normally biased negatively to prevent conduction, by bias battery or other potential source 105 having its negative terminal connected to the grid of the tube. The positive terminal of bias source 105 is connected to a terminal of secondary winding 106 of transformer T$_1$. The other terminal of winding 106 is connected to line 96 which is connected to brush 107 and to the cathode of thyratron 108. Line 96 is also connected to the cathode of thyratron 109 through resistor 110 and to the cathode of electronic tube 111 through resistor 112. Thyratron 109 is normally biased negatively by bias source 113 the positive terminal of which is connected to line 96 through resistor 114. Brush 115 is connected to the negative terminal of battery or other current source 116 the positive terminal of which is connected to the positive terminal of bias source 113 and to connected resistor 114. Brushes 107 and 115 do not pass current from battery 116 until contact 41$_a$ on disc 41 bridges them. In this specification the term "battery" will be used to denote a battery, a direct current unit comprising rectified, filtered alternating current, or any other suitable source of direct current or voltage such as a generator.

The anodes of thyratrons 108 and 109 are connected to line 34 through respective resistors 117 and 118, and condenser 119 is connected to these anodes so that one tube will be extinguished if the other is fired. The anode of evacuated tube 111 is connected, through switch 259, with switch contact 33 to which line 34 is also connected. The cathode of tube 111 is connected to conductor or line 36$_a$ which is connected to positive line 36 and to brush 120 in contact with slip ring 42$_a$. Slip rings 43$_a$ and 44$_a$ also have similar brushes connected to line 36 as indicated. The grid of tube 111 is normally biased negatively to cut-off by battery 121 the positive terminal of which is connected to the cathode of thyratron 109, and to an end of resistor 110 the other end of which is connected to negative line 96.

Relay coil 31$_a$ is connected in series with solenoid 5 and relay arm 31$_b$ is connected to the anode of tube 31. Relay contact 31$_c$ is connected with the cathode of tube 31 and so, when solenoid 5 is energized, for performing division or subtraction, relay coil 31$_a$ will be simultaneously energized to bring arm 31$_b$ against contact 31$_c$ to short circuit tube 31. Resistor 31$_d$ may be included to limit the current. This insures that the negative line of the counting circuits will be conductive for division or subtraction. This relay could of course be closed manually.

Slip rings 122, 123, and 124 are fastened to shaft 37 to rotate with it. These rings have an insulating portion of plastic or other material and a metal portion. The metal or conducting portions of the rings are in contact with the respective associated brush pairs 125, 126, and 127 while the sweeping brushes under key segments 42, 43, and 44 are in position to strike any of the contacts of these fixed segments. When the brushes 128, 129, and 130 are out of operating position the brushes 125, 126, and 127 are in contact with insulating portions of their associated slip rings. The details are seen more clearly in the enlarged view of Figure 4b and in Figures 4c, 4d and 4e. The brushes 128, 129, and 130 are staggered so that the carry-overs will operate in sequence.

One brush of each of the brush pairs 125 and 126 is connected to positive line 36$_a$ which is connected with the cathode of evacuated tube 111. Line 36$_a$ is also connected with brush 120. Likewise, one brush of brush pair 127 is connected to line 36$_a$ through conductors 131 and 36. Brush 132, in contact with slip ring 43$_a$, is also connected to line 36$_a$ through conductors 131 and 36. Brush 133, in contact with slip ring 44$_a$, is connected to lines 36 and 36$_a$.

Terminal 134 of key segment 42 is electrically connected with the last or tenth contact 201 against which brush 128 sweeps in counter clockwise direction as viewed from the right. Details of the multiplicand or divisor keys and contacts are shown in Figures 4a and 5 which will be described later. The tenth contact in both units 42 and 43 are similar to contact 201 shown in Figure 4a. Terminal 135 is connected to the ninth contact 202 and to contact 136 against which relay armature 137 is pulled when relay winding 138 is energized. Armature 137 is normally touching contact 139 connected with terminal 134.

Relay winding 138 connects the cathode of thyratron 140 and negative line 96. A bias battery and resistor 141, in series, connect the grid of thyratron 140 with line 96, the battery biasing the thyratron negatively to prevent conduction normally. The anode of this thyratron is connected to the other brush 125. Armature 137 is connected to relay contact 49 by means of conductor 142. Similarly, relay contact 50 is connected to relay armature 143 by means of conductor 144 and relay contact 51 is connected to relay armature 145 by means of conductor 146. The anode of thyratron 147 is connected with the remaining brush 126 and relay coil 148 is connected between the cathode of thyratron 147 and negative line 96, through conductor 149. Resistor 150 is connected to line 149 and to the positive terminal of a bias battery having its negative terminal connected with the grid of thyratron 147. Relay contact 151 is connected with terminal 152 which is connected with the "9" or next to last contact of multiplicand-divisor segment 43. Relay contact 153 is connected with terminal 154 which is connected with the last or tenth contact of unit 43.

Thyratron 155 is similar to thyratrons 140 and 147 and has its anode connected to one of the brushes 127 the other of which is connected with positive line 36 by conductor 131. Resistor 156 is connected to the positive terminal of a bias battery the negative terminal of which is connected to the grid of thyratron 155. Relay coil 157 is connected between the cathode of tube 155 and line 149 and so to negative line 96. Relay contact 158 is connected with the terminal 159 connected with the ninth contact of multiplicand-divisor unit 44. Relay contact 160 is connected with terminal 161 which is connected with the last or tenth contact 201 of unit 44. Thyratrons 140, 147, and 155 are normally biased negatively to be non-conducting. Likewise, relay armatures 137, 143, and 145 are normally held by springs in contact with contacts 139, 153, and 160, respectively.

For division, switch 11 is brought into connection with switch contact 33 and switch 259 is closed. Then positive line 12 is connected with the anode of thyratron 109 which does not fire until metal insert 41$_a$ flush with the peripheral surface of disc 41, is rotated in the direction of the arrow until it bridges brushes 115 and 107. At that time current from battery 116 passes through resistor 114 in a direction to cause a positive net bias to be applied to the grid of tube 109 so that this thyratron is fired. Resistor 108$_a$ may be included for balance. Conductive insert 41$_a$ is so placed that tube 109 is fired just before any of the brushes 128, 129, or 130 starts sweeping under divisor contacts of units 42, 43, or 44. When thyratron 109 is fired, the grid of tube 111 is made positive due to current flow through resistor 110 and so the positive brushes 120, 132, and 133 are made effective for producing pulses in the numeral thyratron system only at a position or positions of brushes 128, 129 and 130 corresponding to proper starting points and not after the brushes have passed the first divisor contact as may otherwise have been the case.

Bias battery 134$_a$ is connected with the grid of thyratron 108 and to transformer winding 135$_a$ which is connected to negative line 96. Normally, battery 134$_a$ biases the grid sufficiently negatively to prevent conduction of the thyratron. When, however, thyratron 108 is fired, thyratron 109 is extinguished and bias battery 121 quickly biases tube 111 negatively to stop flow of current from line 12 through this tube. After thyratron 109 is fired as a result of contact 41$_a$ bridging brushes 115 and 107, this thyratron remains in the conducting state while brushes 130, 129, and 128 are sweeping under the divisor contacts, in that order. Assuming that brush arms or blades 77 and 78 are touching contacts 79, for division, the brushes 130, 129, and 128 will continue to put pulses into resistors 20$_c$, 20$_d$, and 20$_e$ until a "9" shows up in numeral column F, the numerals increasing in the direction shown in Figure 1, i.e. the division "9's" are equivalent to multiplication "0's."

When the "9" thyratron is fired for row F then a sudden rush of current in primary winding 82$_b$ in series with the "9" tube of row F induces a voltage pulse in associated secondary winding 82$_a$ of the transformer and this pulse will under those circumstances be applied across resistor 99 in a direction to bias the grid of tube 57 positively thereby firing this thyratron, switch 101 having been closed. When this happens current from positive line 12$_a$ passes through resistor 58, through conductor 59 and resistor 56 and on through thyratron 57 to negative line 96. The current flow sets up a potential difference across the ends of resistor 58 but current does not flow through relay coil 52 until contact 39$_a$ of disc 39 is brought around so that it bridges brushes 54. At that time current from resistor 58 flows though relay coils 52 and 253 and relay arms 45, 46, and 47 are snapped over against respective contacts 49, 50, and 51 in a fraction of a second. Contact 39$_a$ is placed in disc 39 in such a position that it closes the circuit to the relay coil just after the brushes 128, 129, and 130 have passed beneath the last or tenth contacts of key units 42, 43, and 44.

When relay arms 45, 46, and 47 are snapped over as described, the respective switch blades 74, 75, and 76 will be electrically connected with the last contact terminals 134, 154, and 161, respectively, of key units 42, 43, and 44, through respective relay arms 137, 143, and 145 and associated contacts 139, 153, and 160. The relay arms 45, 46, 47 are pulled over as described before brushes 128, 129, and 130 rotate through a sufficient angle to wipe under the key unit contacts again. When these brushes again touch the key unit contacts, relay 48 has effectively switched the connections of blades 74, 75, and 76 from the beginning or zero contacts to the other end or tenth contacts 201 of the key units which contacts are connected with respective terminals 134, 154, and 161. Therefore these brushes will then pulse the circuits including blades 74, 75, and 76 a number of times corresponding to 10 minus the key number depressed rather than the number depressed. For instance, if the "7" key of unit 42 is depressed then the circuit including blade 74 will be pulsed 3 times. If the "5" key of unit 43 is depressed, then the circuit including blade 75 will be pulsed 5 times, and if the "2" key of unit 44 is depressed then the circuit including switch blade 76 will be pulsed or energized 8 times.

After the brushes have passed under the last or tenth contacts of units 42, 43, and 44, contact 40$_a$ in disc 40 bridges brushes 55 and closes the circuit from battery or other current source 61, including relay release coil 63, relay coil 63$_a$, primary winding 60 of transformer T$_1$, magnet coil 62, and transformer primary winding 162 which is associated with secondary winding 163 connected in series with transformer primary winding 164 which is associated with secondary winding 135$_a$ connecting the positive pole of bias battery 134$_a$ and negative line 96.

When contact 40$_a$ is swept under brushes 55, thus closing the circuit including battery 61, relay latch 53 is quickly pulled away to release arm 45 so that the relay spring quickly pulls arms 45, 46, and 47 again into contact with relay contacts 49$_a$, 50$_a$, and 51$_a$, respectively. At the same time the sudden current in primary winding 60 induces a pulse of potential in secondary winding 106 which momentarily biases the grid of thyratron 102 positively so that this thyratron is fired, thereby extinguishing thyratron 57 through the agency of charged condenser 104. Simultaneously, the current pulse in transformer winding 162 induces a current pulse in secondary winding 163 which causes a pulse of current in transformer primary winding 164. This current pulse induces a potential pulse in secondary winding 135$_a$ which, temporarily biases the grid of thyratron 108 positively and so fires this tube, which causes thyratron 109 to be extinguished, due to charged condenser 119.

When relay coil 63 is traversed by current, relay coil 63$_a$ in series with it is simultaneously magnetized and pulls relay arm 264 over against a stop so that the circuit including brushes 55, battery 61, coils 63 and 63$_a$ and the other coils in series, is opened but since relay contact 265 is an elongated wiping contact, the energization of coils 63 and 62 will be maintained sufficiently long for latch 53 and arm 64 to be moved through operative distances. Relay arm 264 has no attached spring so that it remains against the stop as shown, after being magnetically pulled over by energized coil $63_a$, and it remains in contact with wiping element 265 after being magnetically pulled thereagainst by relay coil 263 when energized as a result of contact $39_a$ bridging brushes 54 after current flow in resistor 58 is established. Relay arm 264 then remains touching contact 265 until relay coil $63_a$ is again energized to pull the arm 264 over again as described. Coil 263, being in series with coil 52, is energized simultaneously with that coil. This construction prevents coils 60, 62, 162, and 63 from being repeatedly energized due to repeated movements of contact $40_a$ past brushes 55. Pawl 65 is therefore released only after coil 52 is energized and after contact $40_a$ subsequently bridges the brushes 55.

Magnet coil 62 is energized simultaneously with coil 63 and quickly attracts arm 64 so that pawl 71 is yieldingly pressed against the edge of notched disc 67 and pawl 65 is rotated about pivot 69 out of a notch 66. When this happens, spring 240 which was put under tension by armature 165 of solenoid 166 being drawn into the solenoid as a result of the energization thereof when switch 11 is closed against contact 33, pulls on cord 167 and rotates disc 67 half a notch spacing clockwise until pawl 71 falls into a notch. When the energization of coil 62 ceases a moment later spring 70 quickly pulls pawl 65 back against disc 67 and it falls into the next adjacent notch, thereby stopping the disc one notch further in clockwise direction or in position so that switch blades 74, 75, 76 have all moved one contact in clockwise direction so that relay armatures 45, 46, and 47 will be electrically associated with, say, the thyratrons of rows D, C, and B instead of with rows E, D, and C as before.

The situation as described is that brushes 128, 129, and 130 have just passed under their last or tenth contacts, and contact $40_a$ has closed a circuit which has caused deenergization of coil 52 and temporary energization of coil 63 thereby releasing relay arms, 45, 46, and 47, and the closed circuit has also extinguished thyratron 57 so that coil 52 will not be energized when contact $39_a$ next bridges brushes 54 and, likewise, thyratron 109 is extinguished, thereby causing tube 111 to become non-conductive in effect until contact $41_a$ rotates nearly half a revolution and bridges and brushes 115 and 107 again, thereby firing thyratron 109 and causing tube 111 to apply voltage to brushes 120, 132, and 133 at the proper time. It is not essential that tube 111 shall cut off current from these brushes until the last necessary sweep of brushes 128, 129, and 130 for the particular division involved, is made. Tube 111 should be biased to cut-off at that time however to prevent brushes 128, 129, and 130 from continuing to feed pulses into the numeral thyratrons A, B, C etc.

Counting unit 168 comprises a plurality of rows of thyratrons and lamps, H, I, J, K, each row of thyratrons being connected in a counting circuit similar to that in which thyratrons 9 are connected as shown in Figure 1. Each thyratron may likewise be connected in series with a lamp similar to lamps 8. These lamps, when lighted, illuminate one of the numeral windows in each row H, I, J, K which has been pulsed by applying energy to resistors $20_h$, $20_i$, $20_j$, $20_k$, in sequence, or to some of these resistors, depending upon the number of digits in the dividend. One terminal of each of resistors $20_h$, $20_i$, $20_j$, and $20_k$ is connected to relay armature 174 which is pulled against contact $174_a$ when relay coil 175 is energized. Contact $174_a$ is connected with brush 170 and coil 175 is connected in series with resistor 176 and thyratron 177 between positive line $12_a$ and negative line 96. Brush 171 is connected to line 96. These brushes are suitably pressed against the edge of disc 172 which is fastened to the shaft 37 of motor 38. Metal bar or contact 173 is inserted in the insulating disc 172 flush with the peripheral surface thereof.

The negative pole of bias battery $177_a$ is connected to the grid of tube 177 and the positive pole of this battery is connected to a terminal of transformer secondary 178 the other end of which is connected to line 96. Transformer primary 179 associated with secondary 178 is connected in series with transformer secondary 180 which is associated with primary winding 181 connected between line 34 and resistor 118 connected to the anode of thyratron 109. The bias battery $177_a$ is connected to the grid of thyratron 177 to bias it negatively to cut-off normally.

The anode of thyratron 182 is connected to positive line $12_a$ through resistor 183 and condenser 184 is connected between the anodes of thyratrons 177 and 182. The cathode of thyratron 182 is connected to negative line 96 and the negative pole of bias battery 185 is connected to the grid of thyratron 182. The positive pole of this battery is connected to one terminal of transformer secondary winding 186 the other end of which is connected to negative line 96. Transformer primary winding 187 is connected in series with transformer secondary winding 188 which is associated with primary winding 189 connected in series with resistor 117 between conductor 34 and the anode of thyratron 108.

Positive line $12_a$ is flexibly connected to resilient metal switch arm 190 extending from insulating disc 67 in radial direction. This switch arm is adapted to be brought into contact with metal buttons 191, 192, 193 and 194, consecutively as disc 67 is moved from its extreme left position to its extreme right position shown. When arm 190 is in contact with button 191 switch arms 74, 75, and 76 are touching respective buttons or contacts 29, 28, and 27. When arm 190 touches contact 192, arms 74, 75, and 76 touch respective contacts 28, 27, and 26. When arm 190 is in contact with button 193, arms 74, 75, and 76 touch respective contacts 27, 26, and 25, and when arm 190 touches contact 194 as shown, arms 74, 75, and 76 touch respective contacts 26, 25, and 24 as illustrated. The pawl or catch 65 positions the disc and arms as described by falling into the successive notches 66 as magnet 62 releases the catch successively. The contacts or buttons are of course suitably supported on insulating plastic or other insulating material.

Contacts 191, 192, 193 and 194 are connected, respectively, with the positive potential ends of resistors $20_h$, $20_i$, $20_j$ and $20_k$, by means of conductors 195, 196, 197, and 198. Resistors $20_h$ to $20_k$ serve similar functions as resistors $20_a$, $20_b$, $20_c$ etc. for the associated rows of thyratrons. When current from positive line $12_a$ is sent through resistor $20_h$, a pulse is put into the multiple thyratron counting circuit H and a successive thyratron is fired each time a pulse of current traverses resistor $20_h$. The counting circuits for the rows H, I, J, K, except for carryover, are connected in the same manner as the counting circuit for row A of Figure 1 but in rows H, I, J, K, there are 11 thyratrons each instead of ten thyratrons as employed in each of the rows A to F. The numerals of unit 168 indicate the sequence of firing of the thyratrons but the first thyratron units in each row are not numbered. The second thyratron unit or associated window of each row is numbered "0" and third windows are numbered 1 and so on up to the eleventh windows which are numbered "9." This is done since the unit 168 is pulsed once for each revolution of shaft 37, after the initiating thyratron 177 is fired and the pulsing per revolution continues until thyratron 182 is fired. The latter thyratron is fired as a result of a "9" showing to the left of switch arm 74 but this represents one revolution too many. Therefore, if the numeral indication for each row of dividend unit 168 is one less than the number of thyratrons fired for that row, then the correct numerals of the dividend will be shown in the windows.

The construction of multiplicand-divisor key units 42, 43, and 44 is shown in Figures 4a and 5. Each of these units is identical except for the phasing of the brushes 128, 129, and 130. As an illustration, the construction of unit 44 will be described. Ring segment 199 is made of metal or of insulating plastic like Bakelite or the like. If made of metal the mica, plastic, or other insulating separators 200 and 201$_a$ are attached to the ends of segment 199 by means of cement or screws. Metal segment 201 completes the circular ring and is attached to insulating element 201$_a$ by cement or otherwise. Elements 200 and 201$_a$ are situated, respectively between the "0" and "1" keys and beyond the tenth contact 201 as shown. The multiplicand-divisor key stems 203 are preferably made of insulating material such as Bakelite, ceramic coated metal, or other natural or synthetic insulating substances. These stems are attached to the buttons shown numbered from "0" to "9" and are preferably of rectangular cross section to prevent them from turning. The key stems are slidable in radial slots cut in circularly curved overhanging shelf portion 204 attached to separated metal segments 202. The "0" key 205 is slidable in a radial slot cut in segment 199. Arcuate strip 206 of insulating material is screwed to the face of curved shelf 204 to prevent the keys from falling out of the slots but sufficient play is allowed so that the keys will slide easily.

Truncated pyramids 207, made of metal, graphite, or other conductive material are fastened to key stems 203. Metal elements 207 may be molded or pressed around the key stems or cemented or otherwise attached. Small cams 209 are fastened to stem portions 208 as shown and these are normally in contact or nearly in contact with small cams 210 integral with arcuate strip 211 concentric with the axis of shaft 37 and having sliding bearing in bearing blocks 212 and 213 which have curved slots through which strip 211 may slide. One end of tension spring 214 is attached to strip 211 and the other end of this spring is attached to block 213 which is fastened to disc or wall 215 by means of screws. This wall is preferably of insulating material and is fastened to element 223. Block 212 is likewise fastened to wall 215. Stop lug 216 is integral with strip 211 and limits the travel of the strip under influence of spring 214 by striking block 213.

The inner end portions of key stems 203—208 are slidable in radial slots in arcuate bearing member 217 fastened to wall 215 and concentric with shaft 37. As shown in Figure 5, the bearing member 217 may be placed on similarly curved off-set strip 218 which is contiguous to plate or wall 215 and screws are then passed through holes in both strips 217 and 218 and are threaded into holes in wall 215. Brush 130, made of any suitable material such as metal or graphite, is radially slidable in a slot in arm 219 which is integral with collar 220 surrounding shaft 37 and fastened thereto by means of set screws or the like. Collar 220 is made of Bakelite or other insulating material and has concentric metal slip ring 44$_a$ attached to it. This slip ring is of larger inner diameter than the diameter of shaft 37 so there will be no electrical contact between the slip ring and shaft. Spring 222 in the slot in arm 219 urges brush 130 radially outward against inner circular surface of element 223 attached to member 199. This inner surface is concentric with the axis of shaft 37 and is smoothly joined to insulators 200 and 201$_a$ in case element 223 is of metal or to elements 202$_a$ and 201 if member 223 is an insulator so that brush 130 can be rotated around a smooth circular surface comprising element 223 and the inner circularly curved surfaces of elements 202$_a$, 202, 201 and Bakelite or other insulating members 224 separating the metal elements 202 (Figure 6). The assembly may be made by cementing or otherwise attaching the components.

Another type of construction is shown in fragmentary Figure 7. Back plate 225 may be an annular ring or disc of Bakelite or other insulating material and has integral circularly arranged insulating trapezoidal separators 224 placed snugly between metal elements 202 which may be attached to disc or ring 225 by means of screws or cement. As before, the inner circular surfaces of elements 202 and 224 are smoothly joined so that brush 130 may slide easily around these surfaces and the joined surface of element 223.

Figure 4B:
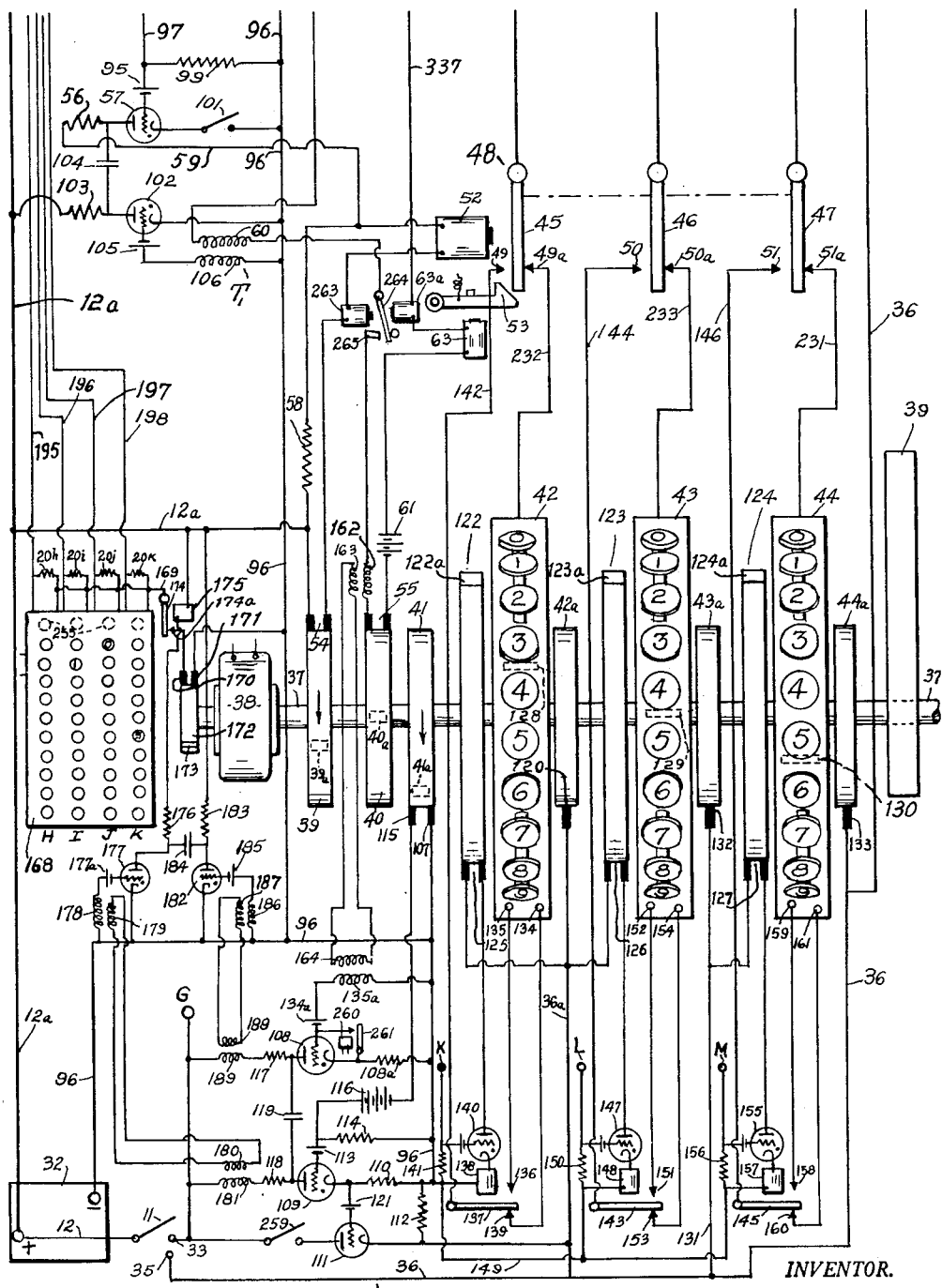
Figure 4b is an enlargement of the lower left portion of Figure 1.

Resilient metal brush 133 is in contact with slip ring 44$_a$ and is fastened to block 227 attached to or integral with disc 215. This brush may be of the graphite type if desired and is connected with positive line 36 as shown in Figure 4b. It will be observed that only the brush assembly rotates with shaft 37. The surrounding multiplicand-divisor key-supporting structures are fixed to bottom or floor 221 of the machine, being attached by screws 226 as shown in Figure 4a.

As indicated in Figures 1 and 4b, there are three identical multiplicand key units 42, 43, and 44 constructed as described above. Slip ring 42$_a$ is electrically connected with brush 128, slip ring 43$_a$ is electrically connected with brush 129, and slip ring 44$_a$ is electrically connected with brush 130. Suitable conductors may be passed through holes in insulating collars 220 and similar collars and are fastened to the respective rotating brush holders and slip rings or the conductors may be fastened to the rotating brushes by means of yielding or flexible connections. The keys are normally urged radially outward by springs 227 coiled around key stems 203 and the spring ends press against the outer surface of member 204 and against the key buttons. The springs therefore normally maintain metal trapezoidal elements 207 tightly in contact with adjacent metal projecting, oppositely inclined trapezoidal elements 202.

As shown in Figure 6, brush 130 will make and break the circuit including elements 202 as it sweeps around these elements and insulating separators 224 which are wider than the brush in circumferential direction. The first metal element 202$_a$ is electrically connected with contact 228 fastened to zero key stem 229, by means of flexible conductor 229$_a$. Contact 228 is normally held against contact 230 which is attached to insulating member 215. Contact 230 is connected to contact 51$_a$ by means of conductor 231. Similar zero key contacts are provided for units 42 and 43 and are connected to respective relay contacts 49$_a$ and 50$_a$ by conductors 232 and 233. Similarly, the first contact elements of units 42 and 43 are connected to similar zero key contacts.

Brushes 120, 132, and 133 in contact with respective slip rings 42$_a$, 43$_a$, and 44$_a$, supply current to the respective brushes 128, 129, and 130 which are rotated by shaft 37 in counterclockwise direction as seen in Figure 4a. It is evident, for example, that brush 130 will close the circuit including contact 51$_a$ and brush 133 when it touches element 202$_a$ provided zero key contacts 228 and 230 are held in contact by the zero key spring; and brush 130 will break the circuit each time it sweeps across an insulating separator 224. If the "nine" key is depressed, the brush 130 will make and break the circuit nine times as it sweeps past the contact elements 202$_a$ and 202. If the zero key is depressed the contacts 228 and 230 will be separated and so the circuit including brush 133 and contact 51$_a$ will be broken. The brush 130 will, under those conditions, not supply intermittent pulses or current variations to contact 51$_a$.

If any other multiplicand-divisor key is depressed, its metal element 207 will be pushed away from the contact surfaces of elements 202 on either side and the circuit including elements 207, 202, and 202$_a$ in series, will be broken. The number of effective contacts remaining in circuit will be the same as the numeral on the key depressed. For instance, depressing the "6" key leaves six contacts 202 (including contact 202$_a$) effectively in circuit and depressing the "3" key leaves 3 contacts 202 effectively in circuit. It will be evident that as rotating brush 130 strikes first contact 202$_a$ it will break the circuit when the next insulation element 224 is passed over and the circuit will similarly be made and broken once for each succeeding key including the key which is depressed. Since the depressed key breaks the circuit leading from brush 130 back through the series-connected elements as described, the brush will not be in circuit beyond or forward of the key depressed. If desired, elements 207 may be of resilient construction or may be swivel-mounted on the key stems to insure that both metal contacts 202 on either side will be touched. It is preferable that the zero key stem 229 be of Bakelite or other insulating material, or that contact 228 be insulated from the stem if it is of metal.

When any key is depressed its cam 209 quickly strikes a cam 210 and pushes curved strip 211 a short distance in counter clockwise direction. When this happens any key already depressed is released due to its catch or cam 210 being carried away from its cam or catch 209 and so the key spring 227 quickly returns the released key to its normal position with its metal element 207 bridging the separated contacts 202 on either side. Shortly thereafter the upper surface of the cam 209 of the depressed key hooks under the associated cam element 210 as spring 214 quickly returns element 211 to its normal position with stop 216 against bearing 213. Therefore the key is held in depressed position with its element 207 out of contact with associated elements 202. When any other key is depressed, the key already depressed is similarly released, due in part to the momentum of element 211 carrying the catches or cams 210 slightly beyond the associated cams 209.

Solenoids 166 and 234 are suitably attached to the machine or computer as are other components shown diagrammatically. One terminal of each of these solenoids is connected to conductor 242 which is connected to negative line 96. The other terminal of solenoid 166 is connected to relay contacts 245 and the other terminal of solenoid 234 is connected to relay contact 243. Plunger $235_a$ of solenoid 234 is attached to flexible cable 236 which is attached to an end of tension spring 237 the other end of which is fastened to flexible cable or belt 167 passing around pulley 238 which is rotatable around fixed shaft 68. Pulley 238 is integral with or attached to disc 67. Belt 167 is attached to pulley 238 by means of screw 239 and is also fastened to an end of tension spring 240 the other end of which is attached to an end of flexible cable 241. The remaining end of this cable is fastened to plunger 165 of solenoid 166. When solenoid 166 is energized its plunger 165 is pulled into the solenoid and spring 240 is stretched sufficiently to insure that disc 67 and switch arms 74, 75, and 76 will travel from their extreme left or starting position to their extreme right position shown, when catch or pawl 65 is released a sufficient number of times. Similarly, when solenoid 234 is energized, and solenoid 166 is deenergized, plunger $235_a$ is pulled into solenoid 234 and spring 237 is stretched sufficiently to insure that disc 67 and switch arms 74, 75, and 76 will be rotated from their starting position shown to their extreme left position with these switch arms in contact with respective contacts 29, 28, and 27, when pawl 65 is actuated a sufficient number of times.

When switch blade 11 is thrown to contact 33 for division, solenoid 166 is energized and plunger 165 is drawn into the solenoid as shown. Under this condition spring 240 is stretched and disc 67 is urged in clockwise direction. When switch blade 11 is thrown to contact 35 for multiplication the solenoid 166 is deenergized and solenoid 234 is energized thereby causing plunger $235_a$ to be pulled into the solenoid and stretching spring 237 to urge disc 67 and attached switch arms in counter clockwise direction. It will be observed that, since one terminal of solenoid 5 is connected to line 10 (or to negative line 96) and since the other terminal is connected to terminal "G," then solenoid 5 will also be energized when switch blade 11 is touching contact 33. The machine is set for multiplication by throwing switch 11 to contact 35 and is set for division by throwing switch 11 to contact 33 and closing switch 259 and switch 101.

Brushes 128, 129, and 130 are staggered or phased so that brush 130 will first strike contact $202_a$, then brush 129 will strike its first similar multiplicand contact, and then brush 128 will strike its equivalent first contact. The brushes may be arranged so that any brush which has swept across a contact will be touching an insulating element 224 when the next brush strikes a contact. While three brushes are shown the phasing may be arranged for any number of brushes so that they touch their related contacts in succession, for the various columns, starting with the first column at the right. By means of this sequential or phased arrangement of firing the thyratrons, the carry-overs can operate without interference. Suitable separating or time delay or storage circuits could be used.

The connected terminals of solenoids 234 and 166 are connected to negative line 96 by conductor 242. The other terminal of solenoid 234 is connected to relay contacts 243 and 244 which are connected together. The relay has three relay arms or armatures 246, 247, and 248 connected, respectively, to switch contact 35, switch contact 33, and to positive line $12_a$. Double relay contact 245 is normally touching arm 247 and arm 246 is normally urged against contact 244. Contact 245 is connected with the remaining terminal of solenoid 166 and contact 249 is connected with one terminal of magnet coil 250 which is adapted to pull pawl 65 out of a notch 66 when energized. The other terminal of solenoid 250 is connected to negative line 96. Relay coil 251 is adapted to pull all three relay arms 246, 247, and 248 toward it when the coil is energized, which is accomplished by closing clearing switch 252 the blade of which is connected with positive line $12_a$ and the associated contact is connected with a terminal of coil 251 which coil is also connected with negative line 96. It will be seen that coil 251 will be supplied with current when switch 252 is closed and arm 248 will be pulled over against contact 249 thereby causing current from positive line $12_a$ to pass through magnet coil 250. The other relay arms will be simultaneously moved clockwise about their pivots so that arm 246 is against contact 245 and arm 247 is touching contact 243. When this happens, arm 246 will be connected with solenoid 166 instead of being connected with solenoid 234 as before, and arm 247 will be connected with solenoid 234 instead of being connected with solenoid 166 as before. Since switch contact 33 is connected with arm 247 and since contact 35 is connected with arm 246, contact 33 is normally connected with solenoid 166 and contact 35 is normally connected with solenoid 234. When, however, coil 251 is energized, contact 33 is connected with solenoid 234 and contact 35 is connected with solenoid 166. The reason for this reversal of connections is that after disc 67 and arms 74, 75, and 76 are rotated to their final position, after a calculation, they must be returned to their starting positions for another similar calculation. The position of switch blade 11 with respect to contact 33 or contact 35 determines whether spring 240 or spring 237 shall normally be stretched by one of the solenoids. Then, the temporary closing of clearing switch 252 will cause reversal of solenoid energization, regardless of whether contact 33 or contact 35 is connected with blade 11. Therefore, upon closing switch 252, spring 237 will be stretched if spring 240 was already stretched, and spring 240 will be stretched if spring 237 happened to be already stretched. In any case then, whether the final position of disc 67 is at the extreme right or at extreme left, if is returned to starting position when clearing switch 252 is temporarily closed. This switch may be a button type or of any desired construction.

Arm 253, with right angle ear, is integral with pawl 71 and may be rotated about pivot 72. The ear normally projects beyond the boundary of pawl 65 and is adapted to strike the outer surface of the core of electromagnet 250 when this coil is energized. When the magnet core is struck, arm 253 is rotated clockwise about pivot 72 and pawls 65 and 71 are accordingly swung away from notched disc 67 thereby releasing this disc so that it can be returned to starting position by either spring 237 or spring 240. When switch 252 is opened it is preferable that arm 248 move away from contact 249 before arms 246 and 247 move out of touch with respective contacts 245 and 243. This may be accomplished by making the contacts of resilient construction and limiting the movement of contact 249; or wiping contacts may be used for timing purposes; or arm 248 may not be rigidly connected with the other relay arms and may be provided with a stronger return spring than the others. Therefore pawl 65 will be released to engage a notch 66 before solenoid 166 or solenoid 234 is deenergized.

In order to perform a division, assume that a suitable switch is closed to energize the cathodes of all the electronic tubes, which cathodes may be heated by alternating or direct current. Then motor 38 is connected to a suitable source of current so that brushes 128, 129, and 130 are rotated under the multiplicand-divisor key contacts from "0" to "9," repeatedly, Switch 101 is closed and switch 11 is moved into contact with switch element 33, thereby causing solenoid 166 to pull cord 241 to stretch spring 240. These two switches may be linked to operate together. Then clearing switch 252 is closed for a short interval, solenoid 166 is deenergized and solenoid 234 is energized to pull disc 67 and attached switch arms counterclockwise until lug 262 on disc 67 strikes stop 254. When this happens arms 74, 75 and 76 are touching respective contacts 28, 27 and 26 and switch arms 77 and 78 are in contact with the pair of switch elements 79.

Switch 252 is opened and solenoid 166 is again energized, stretching spring 240 but disc 67 is held by pawl 65 in a position with switch arm 190 touching contact 192. Likewise arms 77 and 78 are then touching respective contacts 79 as described so that transformer winding 82$_a$ is connected with the two terminals of resistor 99, and switch arms 74, 75, and 76 are then touching respective contacts 28, 27, and 26. The closing of clearing switch 252 also causes the "0" thyratrons of tubes 9 (Figure 1) of each row to be fired and also causes the starting thyratrons 255 of unit 168 to be fired, by means to be described later in connection with Figure 9.

The closing of switch 11 also causes current to pass through solenoid 5 so that its plunger 6 pulls numeral sheet 3 toward the solenoid until the plunger is stopped. The fine line numerals of Figure 2, for division, are then in register with the windows as indicated in Figure 1 but only the illuminated numerals will be easily visible as previously described. Due to the connections of the thyratrons, they will be fired then in the order 9, 8, 7, 6, 5, 4, 3, 2, 1, 0, assuming that all the "0" thyratrons are initially fired. Therefore, for each current or voltage pulse passed through a resistor 20$_a$, 20$_b$, or the like, one digit will be subtracted from the associated indication in a numeral window. The "0" thyratrons for division are the same as the "9" thyratrons for multiplication. Therefore if it is desired to fire all the "0" thyratrons for division, the clearing circuit should have a separate multiple pole relay operated in like manner to that described in connection with Figure 9 but connected to fire the "0" division thyratrons. These "0" thyratrons can of course be fired by pressing the proper buttons 256 and a common switch or bar, operated by the division clearing means, can be made to fire these tubes.

Next, the proper buttons 256 are pressed to fire the desired thyratrons corresponding to the number to be divided. Buttons 256 operate switches 257 connected between the thyratron grids and the cathodes or connected negative lines. Only a few of the switches are shown in row A for clarity, but each thyratron 9 in each row has a similarly connected switch which can be momentarily closed by pressing a button 256 to connect the associated thyratron grid to the cathode to fire that thyratron. By means of condensers 22$_a$ and similar condensers, any "0" thyratron or any other fired thyratron is extinguished when another thyratron in the same row is fired. If, for instance, the number to be divided is 24780, the button 256 in row E corresponding to the number "2" will be pressed, then the button 256 in row D corresponding to the number "4," then the button in row C corresponding to the number "7," then the button in row B corresponding to the number "8," and the "0" button in row A is then pressed unless the clearing circuit will cause that thyratron to fire. The pressing of these buttons can be done very quickly. Printed numbers can be placed by each button, corresponding to the number which will be illuminated in a window 258 when the associated lamp 8 is energized with current.

Now if the divisor is to be the number "236" then the "2" multiplicand button in unit 42, the "3" button in unit 43, and the "6" button in unit 44, will be depressed. Then switch 259, which connects tube 111 operatively into circuit, is closed and the dividing action begins soon after contact 41$_a$ is rotated around by disc 41 until it bridges brushes 107 and 115. If the contact is across the brushes at the moment of closing switch 259 the division begins soon after that. Contact 41$_a$ is so placed on disc 41 that it bridges these brushes just before leading brush 130 touches contact 202$_a$. When the contact 41$_a$ bridges brushes 107 and 115 battery 116 sends current through resistor 114 in a direction to fire thyratron 109 at once, overcoming the normal negative bias due to bias battery 113. Thyratron 108 is previously fired when relay coil 260, which is connected in circuit with magnet coil 250, is momentarily energized when clearing switch 252 is closed. This causes relay arm 261 to connect the grid of tube 108 to its cathode for a moment, thereby firing the tube. Electronic tube 111 which controls current from source 32 to brushes 120, 132, and 133 is biased negatively to cut-off until thyratron 109 is fired but when that occurs the sudden current flow through resistor 110 provides a positive grid bias sufficient to cancel enough of the negative bias due to battery 121 to cause tube 111 to pass appreciable current. In effect then, current is supplied to brushes 120, 132, and 133 only when and after contact 41$_a$ bridges brushes 107 and 115. Then brush 130 sweeps across all the contacts 202$_a$ and 202 of unit 44, and feeds a pulse through relay arm 47 for each contact touched up to and including the same number corresponding to the key depressed. The remaining contacts 202 (Figure 4a) beyond the depressed key are out of circuit and do not cause pulses. Since in the specific example given, the "6" key in unit 44 was depressed, brush 130 will feed six current pulses through relay arm 47. Since at the beginning of the division connected switch arm 76 is touching contact 26 these six pulses will be applied to resistor 20$_c$ and so thyratrons "6," "5," "4," "3," "2" and "1" in row C (Figure 1) will be fired in succession so that only the numeral "1" will show in the corresponding window 258 of row C. Similarly, since the "3" key of unit 43 is depressed brush 129 will sweep past three contacts in circuit and three current pulses will be passed through relay arm 46 and connected switch arm 75 which will be in contact with element 27. Therefore three current pulses will be supplied to resistor 20$_d$ connected to contact 27 and so three thyratrons in row D will be fired in the order "3," "2," "1," since the "4" thyratron was already fired. Next, brush 128 will sweep over the two contacts in circuit in unit 42 and so two current pulses will be sent through relay arm 45 and through connected switch arm 74 which is in contact with element 28 connected to resistor 20$_e$. Therefore two current pulses will be sent through this resistor and two thyratrons in row E will be fired in the order "1," "0," since the "2" thyratron was already fired.

As explained before, the brushes 128, 129, and 130 are so phased that they do not produce overlap or interference in firing the thyratrons. Other types of separators or time delays for this purpose could be employed. The action so far described takes place with one traverse of the multiplicand contacts by the brushes. On the second traverse of the multiplicand key contacts by brush 128 the "9" thyratron of row E will be fired, since the "0" thyratron had last been fired, and the sudden rush of current in transformer primary 83 induces a pulse of current in secondary winding 94 in such direction that the normal negative bias of the "9" thyratron of row F is largely overcome and this thyratron is therefore fired. When this happens a pulse of current is developed in primary winding $82_b$ which induces a pulse of current in secondary winding $82_a$ which current pulse passes through switch arms 77 and 78 at that time resting on contacts 79. This current pulse traverses connected resistor 99 in a direction to provide positive bias for thyratron 57, cancelling a large part of the negative bias caused by battery 95 and thus firing this thyratron. When thyratron 57 is fired, current from positive line $12_a$ passes through resistor 58, through resistor 56 and the thyratron and through switch 101 to negative line 96. The current traversing resistor 58 creates a potential difference across the ends of this resistor and as soon as contact $39_a$ on disc 39 is rotated around to bridge brushes 54, this potential difference is applied to relay coil 52 so that mechanically connected relay arms 45, 46, and 47 are quickly magnetically pulled over against respective contacts 49, 50, and 51. Contact $39_a$ is fixed to disc 39 in such position that relay coil 52 is energized shortly after brush 128 has swept past the last contact of multiplicand unit 42. When arm 45 is pulled over it is held in place against contact 49 by spring latch 53 and accordingly, arms 46 and 47 are likewise held against respective contacts 50 and 51.

It has already been described how contact $40_a$ bridging brushes 55 causes latch 53 to release relay arm 45 and simultaneously causes thyratrons 57 and 109 to be extinguished, as well as causing pawl 65 to release disc 67 for one notch movement clockwise. The disc could be released manually if desired, when "9's" appear. Disc 40 is shown directly attached to shaft 37 but it or disc 39 or disc 41 could be geared to shaft 37 to be driven at a different relative rate if desired. In some cases a different rate may be desirable for timing or phasing purposes. As previously described, the brushes 55 are bridged just after brush 128 has passed by the tenth contact connected with terminal 134. There is then a time interval of approximately half a revolution of shaft 37 during which relay 48 may be reset and disc 67 may be moved one notch. While mechanical switches and relays are shown electronic relays or switches comprising suitable electronic tubes could be used to provide very fast operation.

Since the "9" keys or depressed keys before that will always break the pulsing circuit, the tenth contacts 201, for the three units, will not add a tenth pulse. When, however, relay arms 45, 46, and 47 are touching respective contacts 49, 50, and 51, the effective contacts will be those on the forward or high side of the depressed key, for any unit 42, 43, or 44. In that event the contacts 201 connected to terminals 134, 154, and 161 will be in circuit to provide pulses.

As pointed out before, the number of pulses produced in each relay arm will then be equal to 10 minus the number of the key depressed. Since the numeral thyratrons are fired progressively in one direction only, this method restores the illuminated numerals in rows E, D, and C back to where they were before the "9" thyratron was fired in row F. This is true if no carryover has occurred from row C to row D or from row D to row E before, of course, latch or pawl 65 is released to allow disc 67 to be rotated one notch. Under this condition, as shown in Figure 8, radially directed switch arms $77_a$ and $78_a$ attached to disc 67 are in contact with elements 80 connected with transformer secondary winding 82 and similar arms $77_b$ and $78_b$ are in contact with elements 81 connected with transformer secondary winding 84, and arms $77_c$ and $78_c$ are in contact with elements $81_a$ connected with transformer secondary 86 of row C. Switch arms $77_c$ has a flexible conductor connected with terminal L which is connected with the grid resistor 150 of thyratron 147. Arms $78_a$, $78_b$ and $78_c$ are electrically connected to negative line 10 and connected line 96 by means of conductor $10_a$ and connected flexible conductor $10_b$. Arm $77_b$ is connected with terminal K which is connected with the grid-connected end of resistor 141 of thyratron 140. Actually, switch arms $77_a$ and $78_a$ are not necessary to the operation of the computer but are shown. It will be noticed that arm $77_a$ is not connected.

Now, with arms $77_b$ and $78_b$ electrically connected with contacts 81, and with arms $77_c$ and $78_c$ electrically connected with contacts $81_a$, if a carryover occurs from row C to row D so that the numeral indicated in row D is reduced by one digit, then an electrical pulse will be induced in transformer secondary winding 86 as transformer primary 87 is suddenly energized when the "9" tube of row C is fired. The electrical pulse in winding 86 is applied through switch arms $77_c$ and $78_c$ to negative line 10 and to grid terminal L and the phasing is such that this pulse will fire thyratron 147. When this thyratron is fired coil 148 is energized and relay arm 143 is quickly pulled against contact 151, against suitable spring tension. When this happens contact 50 and then connected relay arm 46 are electrically connected with the ninth contact of unit 43 instead of the tenth contact which is connected with terminal 154. The ninth contact is connected with terminal 152. Therefore, due to the carryover or rather, carry-under into row D, the number of complementary restoring pulses provided by unit 43 after relay 48 is energized, is reduced by one. The thyratron 147 remains fired until the insulating portion $123_a$ of disc 123 travels to brushes 126 and accordingly breaks the circuit from positive line $36_a$ to the anode of this thyratron. The tube is then extinguished. The insulating portion $123_a$ is located on disc 123 in such position that brush 129 will have passed beyond the tenth contact of unit 43 before the circuit is broken. Relay arm 143 is then released to spring back against contact 153. Metal discs 122 and 124 have similar insulating portions $122_a$ and $124_a$ for extinguishing the respective thyratrons 140 and 155 after the brushes 128 and 130 have passed beyond their tenth contacts.

In like manner, if there is a carry-under from row D to row E, as a result of the "9" thyratron in row D being fired, an electrical pulse in transformer secondary 84 will pass through arms $77_b$ and $78_b$ and will be applied to terminal K, firing thyratron 140. This will energize coil 138 and relay arm 137 will be pulled against contact 136 so that the ninth contact of unit 42, connected with terminal 135, will be electrically connected with relay arm 137 and one less complementary restoring pulse will be applied to the tubes of row D to cause these tubes to show the same indication they had before the brush traverse of the contacts which caused firing of the "9" thyratron in row F. Thyratron 140 and coil 138 are deenergized when insulating portion $122_a$ of disc 122 comes under brushes 125.

While only three key units 42, 43, and 44 are shown, along with three switch arms 74, 75, and 76, and associated components, it is obvious that any practicable number of rows of numeral thyratrons or other indicators and any practical number of associated key units similar to units 42, 43, and 44, may be used. For instance, the device may have eight, twelve, or more rows of numeral indicators and say six or more switch arms and associated multiplicand-divisor key units.

As shown in Figure 8, switch arm 190 is in register with contact 192 when arm 74 is touching contact 28. Now if an electrical pulse is passed from positive line $12_a$ through arm 190, line 196, resistor $20_l$, relay arm 174 and through electronic tube 177 to negative line 96, once for each revolution of shaft 37 and of brushes 128, 129, and 130 during which the brushes are supplying pulses to resistors $20_c$, $20_d$, and $20_e$, then the thyratrons in row I will be sequentially fired a number of times equal to the first digit in the divisor plus 1. The reason that the thyratrons are fired one more time than the proper number of the divisor digit is that they are fired once extra when the brushes make an extra sweep past the contacts of units 42, 43, 44, in order to fire a "9" thyratron in the row to the left of that connected to switch arm 74.

It is obvious that neither of the resistors $20_h$, $20_i$, $20_j$, or $20_k$ will pass current from line $12_a$ and arm 190 until tube 177, normally biased negatively to the point of cut-off, will conduct current. The pulsing operation of brushes 128, 129, 130 is initiated when thyratron 109 is fired. Therefore, due to properly phased or properly polarized transformer windings 180 and 179, a positive pulse is induced in transformer winding 178 to fire thyratron 177 when a pulse of curernt traverses transformer primary 181 when thyratron 109 is fired. When thyratron 177 is fired, current from positive line $12_a$ passes through series connected relay coil 175 which becomes magnetized and attracts relay armature 174 against contact $174_a$ which is connected with brush 170. Therefore, when contact 173 is rotated around until it bridges brushes 170—171, current from arm 190 will suddenly pass through line 196 and resistor $20_l$ and through conductor 169, through contact $174_a$ and to negative line 96 through brushes 170—171. The current pulse through resistor $20_l$ will fire the "0" thyratron of row I and the next contact of element 173 with brushes 170—171, on the next revolution of shaft 37, will pulse element $20_i$ again and cause the next or "1" thyratron of row I in unit 168 to fire. On this next revolution a "9" thyratron in row F will be fired and a pulse of current will be induced in transformer winding $82_a$ which produces a positive bias across resistor 99 to fire thyratron 57 as previously described. When thyratron 57 is fired, current is passed through resistor 58 and relay coil 52 is energized when contact $39_a$ bridges brushes 54 after brushes 128, 129, and 130 have passed beyond the last or tenth contacts of unit 42, 43, and 44. Then relay 48 is latched by catch 53 and on the next traverse of the contacts of units 42, 43, and 44 as rotating shaft 37 brings brushes 128, 129, and 130 around again, the contacts beyond the depressed keys or pulses equal to 10 minus the number of each depressed key will be fed to respective relay arms 45, 46, and 47 which are then in contact with relay elements 49, 50, and 51, respectively. These pulses are therefore supplied to the connected resistors $20_e$, $20_d$, and $20_c$ which will pulse the associated rows or columns of thyratrons the proper number of times to cause these thyratrons to indicate the same numerals which they indicated before thyratron 57 was fired. In case of a carry-over from column C to column D or from column D to column or row E the relay arm 137 or arm 143, or both, are actuated as previously described.

Contact $40_a$ on disc 40 is so placed that it bridges brushes 55 shortly before contact $39_a$ bridges brushes 54. Therefore shaft 37 will rotate brushes 128, 129, and 130 almost a full revolution after relay coil 52 is energized and before contact $40_a$ closes the circuit including battery 61, relay coil 63, latch release coil 62, primary winding 60, relay arm 264, contact 265 and primary winding 162. Relay arm 264 is magnetically held against contact 265 only when associated relay coil 263 is energized. This coil is in series with coil 52. When coils 63 and 62 are energized the latch 53 is pulled away to release the arms of relay 48 and pawl 65 is operated to release disc 67 which is rotated one space clockwise by tensed spring 240. Simultaneously, primary 60 is energized so that a pulse is induced in transformer secondary 106 in such direction that the grid of thyratron 102 is temporarily made positive. This thyratron is accordingly fired and thyratron 57 is quickly extinguished by means of condenser 104 which had been charged due to the potential drop across resistor 56. When thyratron 57 is extinguished the current through resistor 58 ceases and so the next passage of contact $39_a$ under brushes 54 will have no effect in energizing coil 52 and connected coils. These actions occur shortly after brushes 128, 129, and 130 have swept past the last contacts of units 42, 43, and 44. Therefore, these brushes will rotate through almost three fourths of a revolution before contact $41_a$ again bridges brushes 107 and 115 and causes thyratron 109 to be fired again. During this three quarters of a revolution the disc 67 is moved one notch clockwise and relay 48 is restored to its normal condition with arms 45, 46, and 47 again in contact with elements $49_a$, $50_a$, and $51_a$, respectively.

When contact $40_a$ bridges brushes 55 and causes sudden flow of current in primary winding 162, after current flow is established through relay coil 263, an electrical pulse is induced in transformer secondary 163 which produces a pulse in series-connected primary winding 164. This pulse is so phased or polarized that it causes a grid-positive pulse in secondary winding $135_a$ and fires thyratron 108 which quenches thyratron 109 through the medium of condenser 119. When thyratron 108 is fired the sudden rush of current in transformer primary winding 189 induces a pulse in secondary winding 188 and series-connected transformer primary winding 187. This pulse is of such polarity that it induces a grid-positive pulse in secondary winding 186 and so fires thyratron 182 which, through condenser 184, quickly extinguishes thyratron 177. When this thyratron is extinguished current ceases to flow through relay coil 175 and relay arm 174 is quickly released to break the electrical connection with contact $174_a$ and so to stop the counting pulses which had been directed to resistor $20_l$, due to contact 173 repeatedly sweeping past brushes 170—171.

Any counting in unit 168 is therefore stopped when thyratron 177 is extinguished. After disc 67 is moved clockwise one notch spacing, switch arms 74, 75, and 76 will be electrically connected with respective contacts 27, 26, and 25 and switch arm 190 will be electrically connected with contact 193 leading to resistor $20_j$. When contact $41_a$ next bridges brushes 107 and 115 just before brushes 128, 129, and 130 touch the first contacts of units 42, 43, and 44, thyratron 109 is again fired to bias the grid of tube 111 positively again and so to connect positive line 12 to brushes 120, 132, and 133. Simultaneously, the sudden current in primary winding 181 induces an electrical pulse in secondary winding 180 and in series connected primary winding 179 which induces a grid-positive pulse in the grid circuit of thyratron 177 to fire this thyratron, extinguishing thyratron 182. When thyratron 177 is fired relay coil 175 is again energized and arm 174 is quickly pulled against contact $174_a$ so that contact 173 will close the circuit including brushes 170—171 and a current pulse will be sent through resistor $20_j$ to fire the "0" thyratron in column or row J. When this happens the sweep of the brushes 128, 129, and 130 across the contacts of units 42, 43, and 44 will again send two pulses through relay arm 45, three pulses through relay arm 46, and six pulses through relay arm 47, for each effective revolution of shaft 37 and the brushes. In this case these pulses will be applied to resistors $20_d$, $20_c$, and $20_b$, respectively and the number 236 will be subtracted from the indicated numerals in rows D, C, and B. For the numbers chosen for the problem a "9" thyratron in row E will be fired during the first sweep of the brushes 128, 129, and 130 across the contacts and so the resulting current pulse in transformer primary 83 will induce a pulse in secondary 82 which is at that time electrically connected with switch arms 77 and 78. This pulse fires thyratron 57 as before and then contact 39ₐ causes relay 48 to be energized just after the rotating brushes have passed the last contacts of units 42, 43, and 44. The next revolution of the brushes then feeds the complementary pulses through contacts 49, 50, and 51 to restore the illuminated numerals in rows D, C, and B to their original indications as were before the sweep of the brushes which made the "9" tube in row E to fire. Again, if a carryback or carryunder occurred from row B to row C connected thyratron 147 will be fired and if a carryback occurred from row C to row D the connected thyratron 140 will be fired. When these thyratrons are fired, one less number in the associated numeral column will be restored after relay 48 is energized, as previously described. The remaining sequence of operations is the same as before. The numeral "0" is indicated in row J of unit 168 and relay arm 264 is touching contact 265 until contact 40ₐ bridges brushes 55, causing thyratrons 108 and 182 to be fired, thereby causing thyratrons 109 and 177 to be extinguished so that counting in row J ceases and positive line 12 is effectively disconnected from brushes 120, 132, and 133. At the same time thyratron 102 is fired, which extinguishes thyratron 57 and relay coil 52 is deenergized as contact 39ₐ leaves brushes 54. Coils 62 and 63 are energized as described before to cause disc 67 to be rotated one notch spacing clockwise and latch 53 is pulled to release relay arms 45, 46, and 47. While switch arms 74, 75, and 76 were in contact with respective elements 27, 26, and 25, carryback switch arms 77ᵦ and 78ᵦ were electrically connected with transformer winding 86 through contacts 81ₐ and carryback switch arms 77ᵧ and 78ᵧ were electrically connected with transformer winding 88ₐ through contacts 81ᵦ (Figure 8).

Figure 4C:
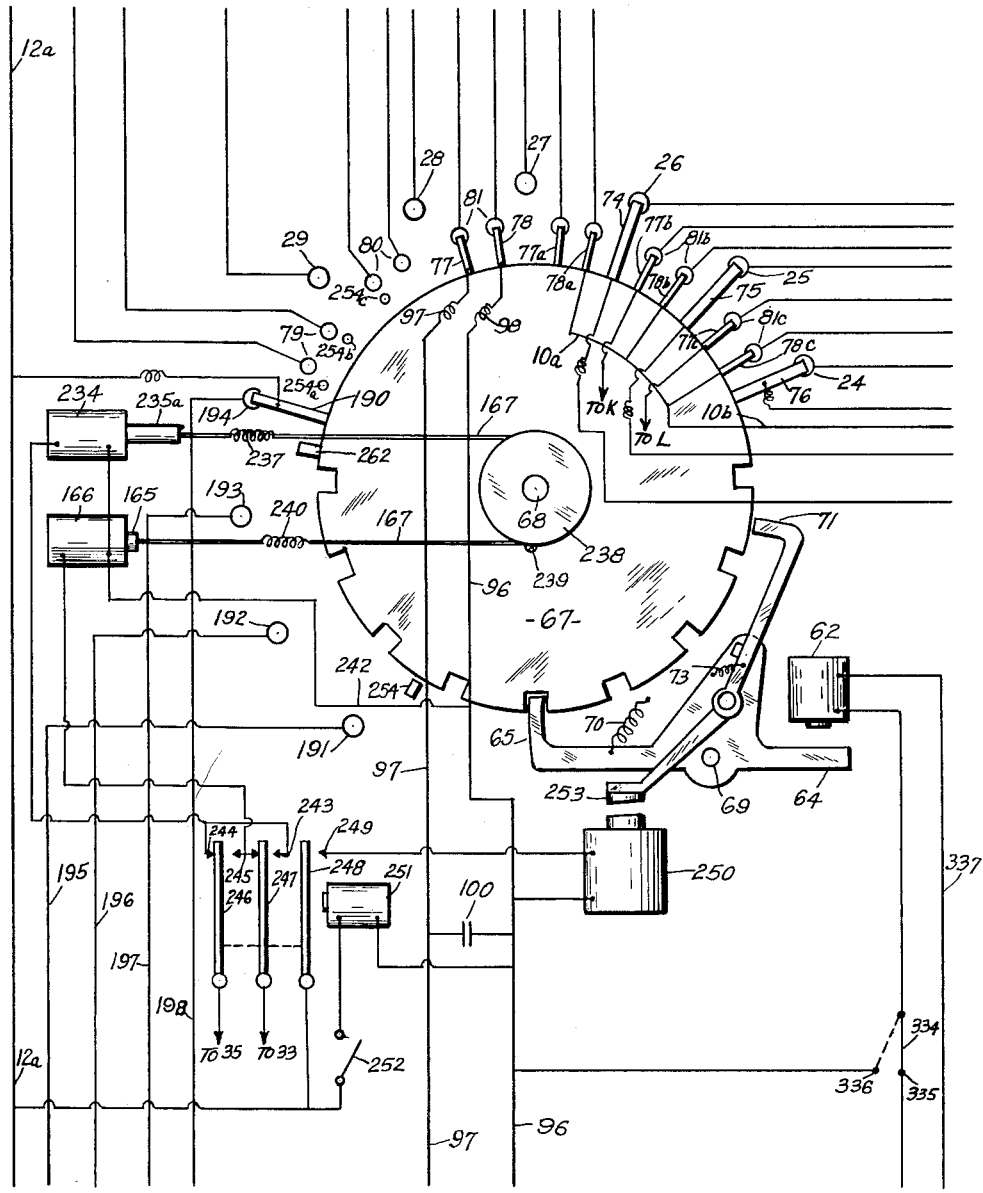
Figure 4c is an enlargement of the left center portion of Figure 1, including the electro-mechanical switch.
Figure 4E:
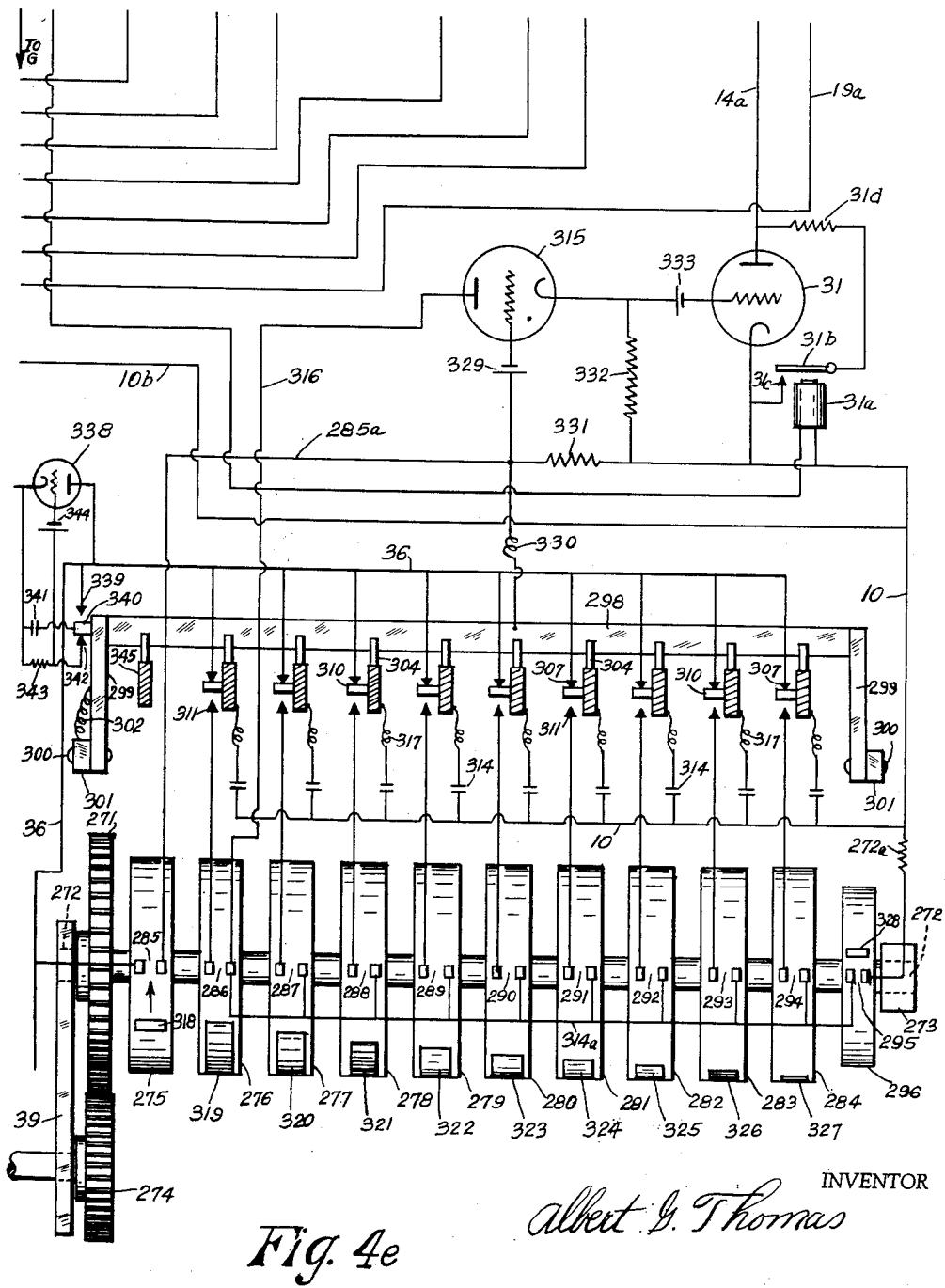
Figure 4e is an enlargement of the lower right portion of Figure 1 and including some connections leading to Figure 4d.

The disc 67 finally stops in the position shown in Figure 4c, with switch arms 74, 75, 76 electrically connected with contacts 26, 25, and 24, respectively. With relay arms 45, 46, and 47 in their normal positions shown, the pulses produced in units 42, 43, and 44 are applied respectively to resistors 20ᵧ, 20ᵦ, and 20ₐ to fire two thyratrons in row C, three thyratrons successively in row B, and six thyratrons successively in row A for each effective revolution of the shaft 37. Any carry backs will cause one or more pulses in winding 88ᵦ or winding 88ₐ and will affect thyratron 147, or thyratron 140, or both, as previously described, through arms 77ᵦ—78ᵦ, or arms 77ᵧ—78ᵧ, or both. The pulses will be fed into thyratron rows C, B, and A until a "9" thyratron is fired in row D. Then thyratron 57 is fired as before since switch arms 77 and 78 will then be connected with secondary winding 84 as shown. The consecutive operations are the same as described before, except that disc 67 is finally stopped by lug 262 striking stop pin 254ₐ, in which position arm 190 is out of contact with element 194 and arms 74, 75, 76 do not touch any of the contacts. During the last counting operation six pulses will have been passed through resistor 20ₖ of unit 168 before thyratron 182 is fired to deenergize relay coil 175 and accordingly to break the counting circuit which includes arm 190 in contact with element 194 as indicated. The thyratron numbered "5" in row K of counting unit 168 will therefore be fired to illuminate the numeral "5" in that row. The dividend will therefore appear as 105 in rows I, J, and K. After the counting, coil 62 is energized as before and disc 67 is pulled by spring 240 until arms 190, 74, 75, and 76 do not make electrical connection with the associated contacts. Therefore there will be no further firing of thyratrons in unit 168.

The stop 254ₐ may comprise a depressible pin or a pin movable into any one of a series of holes similar to holes 254ᵦ and 254ᵧ in a plate or other member. The pin will then serve as a stop, when struck by lug 262, and the holes are so placed that switch arms 190, 74, 75, and 76 will be electrically disconnected for any hole position. If then it is desired to allow the pulsing of the numeral thyratrons to be continued beyond the chosen row which has been set by manually firing the desired thyratrons corresponding to the number to be divided, the stop pin 254ₐ can be set at the position desired and counting in unit 168 will stop after lug 262 strikes the pin. There may be a plurality of stop pins any one of which is made effective by depressing it against a compression spring and any depressed pin may be made to release a depressed pin in much the same manner in which any depressed key in one of the units 42, 43, or 44 is released when any other key in that unit is depressed. Decimal indicators may be used if desired.

While six rows of numeral thyratrons A, B, C, D, E, and F are indicated, it is obvious that any suitable number of rows of thyratrons may be employed like ten or twelve rows, or more for instance. Similarly, there may be many more than the four rows of counting or dividend thyratrons in unit 68 as well as more switch arms similar to arms 74, 75, and 76. Likewise there may be six to ten or more units like key units 42, 43, and 44. The number of rows of thyratrons and associated components and units as described will depend upon the desired capacity of the machine or computer.

Now when the division is completed and the answer 105 appears in unit 168, switch 259 is opened. Since the operation of division is quite fast this switch may be a push button which automatically opens the circuit when released. A time delay relay or other means may be used to hold switch 259 closed for a predetermined number of seconds or fractions of a second and then the switch automatically opens the circuit.

Each "0" thyratron in rows A, B, C, D, E, and F has a relay arm 266 connected to its grid and a contact 267 connected to its cathode line as shown in Figure 9. There can be one relay for the multiplication "0" tubes and another for division "0" tubes. Relay coil 268 is connected in circuit with latch release coil 250 and magnetically brings all the mechanically connected relay arms 266 against the respective contacts 267 when coil 268 is energized. This connects the grids of these tubes to the cathode lines and causes the "0" tubes to fire. A switch, linked with switch 11, can determine whether the multiplication or division "0" tubes are fired on clearing. The contacts 267 may be connected to the cathodes directly if desired. The closing of switch 252 also causes current to pass through relay coil 251 so that solenoid 234 is energized along with coil 250 which releases latches 65 and 71 so that spring 237, which is then tensed due to solenoid 234 pulling armature 235ₐ in it, will rotate disc 67 counter clockwise until stop 262 strikes stop 254 which may be adjustable. Arms 74, 75, and 76 will then be electrically connected with contacts 28, 27, and 26, respectively, and arm 190 will be in contact with element 192. Likewise arms 77—78, 77ᵦ—78ᵦ, and 77ᵧ—78ᵧ will be connected as they were previously, at the beginning of the division process. The thyratrons 255 of counting unit 168 likewise have mechanically connected relay arms similar to arms 266 connected to their grids and contacts similar to contacts 267 connected to their cathodes. The conductors 269 and 270 (Figure 9) connected in parallel with coil 250, are connected with a suitable relay coil similar to coil 268 so that all the thyratrons 255 are fired when switch 252 is closed. Therefore, the temporary closing of clearing switch 252 causes disc 67 to be rotated back to starting position and upon release causes tension to be produced in spring 240 due to energization of solenoid 166, if switch 11 is on contact 33. The closing of the switch 252 also causes the "0" thyratrons of the numeral columns to be fired, thereby extinguishing other associated fired thyratrons and also causes the initial thyratrons 255 of unit 168 to be fired, thereby extinguishing any other fired thyratrons of this unit. It is obvious then that closing switch 252 momentarily will clear the machine for further problems of division if switch 11 is on contact 33 and for multiplication if switch 11 is on contact 35.

The additional components used for multiplication are shown in Figure 1. Gear 271 is fastened to shaft 272 which is rotatable in suitable bearings in supports 39 and 273 fixed to the base or frame work of the machine. Pinion 274 is fastened to the end portion of shaft 37 which is rotatable in bearings in motor 38 and support 39 although another bearing support near the motor may also be used. Discs 275, 276, 277, 278, 279, 280, 281, 282, 283, 284, and 296, preferably made of Bakelite or other insulating material, are fastened to shaft 272 to rotate with it. These discs have respective pairs of brushes 285, 286, 287, 288, 289, 290, 291, 292, 293, 294, and 295 suitably supported and yieldingly pressed against their peripheries. One brush 285 is connected to positive line 36 and the other through conductor 285$_a$ to resistor 331 which is connected to the positive terminal of bias battery 329 of tube 315. Bar 298 is attached to arms 299 made of insulating material. These arms are rotatable about pivots 300 which attach the arms to supports 301 fastened to the base. A spring 302 normally holds bar 298 up, away from contact 339, and against contact 342. Coiled springs around the pivots may be used.

The multiplier keys 303 are shown in cross section as seen from above. These keys are suitably mounted for sliding or rotary movement, as desired, and have attached arms 304 extending from them and over bar 298 so that this bar will be pushed down against contact 339 when any multiplier key is depressed its full travel, or through the required distance. Arms 304 are preferably made of insulating material such as a ceramic or a plastic or the like. These arms may however be integral with metal keys 303 and bar 298 may be covered with insulation on its upper side so that the keys will not be in electrical contact with the bar. Likewise, the keys 303 are suitably insulated one from the other. This may be done by employing key guides of insulating material or the keys may be of insulating material except for the contact.

Figure 10 illustrates a suitable type of key construction. Key 303 has integral arm 304 adapted to strike bar 298 which is brought down against contact 339 which may be fastened to key guide 305 made of insulating material. These guides for the various keys each has a slot 306 in which arm 304 travels and the guide is fixed to the frame-work of the machine. Slot 306 is narrow enough to prevent a key from falling out. Contact 307 attached to guide 305 serves as a stop when struck by contact 310 which is attached to the key stem in insulated manner. The key and contact are urged upward by compression spring 308 surrounding the key stem and pressing against guide 305 and button 309 attached to the upper end of the key stem. Contact 310 is normally held in contact with element 307 and is adapted to strike contact 311 attached to resilient contact arm 312 which is fastened to insulating guide 305 by means of screws or otherwise. Arm 299 is normally held against stop 313 by tension spring 302 attached to the arm and to support 301. Contact 310 is flexibly connected with one terminal of capacitance 314 and the upper contacts 307 for all the keys are connected with positive line 36. As shown in Figure 1, all of the upper contacts 307 are connected to positive line 36 and the lower contacts 311 are connected to one of the brushes of the respective brush pairs 286, 287, 288, 289, 290, 291, 292, 293, and 294. The remaining brushes of these pairs are connected to line 314$_a$ which is connected to the anode of thyratron 315 by means of conductor 316. The flexible conductors 317 are shown as connected to metallic keys 303 which are electrically connected with contact arms 310. If, however, the contact arms 310 are insulated from the keys as in the construction of Figure 10, then the flexible conductors 317 would be connected directly to the contact arms 310.

The individual keys are indicated by the numerals placed above them. Each key except the "0" key has a connected flexible conductor 317 connected to a terminal of an associated capacitance 314. The other terminals of these capacitances are connected to negative line 10 as shown. Insulating disc 275 has contact 318 imbedded in its periphery flush with the surface thereof and is so placed that it will bridge brushes 285 slightly before peripheral metal contact band 319 bridges brushes 286. This contact band extends partly around the circumference of insulating disc 276 and is flush with the peripheral surface. The insulating discs 275—296 are driven in clockwise direction as viewed from the right and the length of band 319 is chosen, together with the ratio of gears 274 and 271, so that the brushes 128, 129, 130 will sweep over the associated contacts of units 42, 43, and 44 nine times before the end of band 319 passes under brushes 286 and so breaks the electrical connection between them. Similar metal or conductive bands 320, 321, 322, 323, 324, 325, 326, and 327 are placed around the peripheries of respective insulating discs 277, 278, 279, 280, 281, 282, 283, and 284 but are of progressively shorter length. In the order named these bands, beginning with band 319, allow the brushes of key units 42, 43, and 44 to be swept across or over the contacts of these units 9, 8, 7, 6, 5, 4, 3, 2, and 1 times, respectively, while the bands are in contact with the respective pairs of brushes 286, 287, 288, 289, 290, 291, 292, 293, and 294. If desired the leading edges of these bands may be phased to come into contact with the respective brush pairs at the same time. Contact 318 is placed on disc 275 in such position that it bridges brushes 285 just before brush 130 reaches the first contact of unit 44.

Line 314$_a$ connected to the anode of thyratron 315 is connected to one of the brushes 295 and negative line 10 is connected to the other brush 295. Contact 328 is imbedded in the peripheral surface of disc 296 in such position that it bridges brushes 295 after the trailing end of band 319 has passed under brushes 286 and before contact 318 bridges brushes 285. Contact 328 therefore serves to short circuit at the proper time any condenser 314 which is connected in series with thyratron 315 when any key "1" to "9" is depressed.

The negative pole of battery or other bias source 329 is connected to the grid of thyratron 315 and the positive pole of this battery is connected to metal bar 298 by means of flexible conductor 330. This positive pole is also connected to one end of resistor 331 the other end of which is connected to negative line 10 and the cathode of electronic tube 31. One end of resistor 332 is connected to the cathode of tube 31 and the other end of this resistor is connected to the cathode of thyratron 315 and to the positive pole of bias battery or other source 333 the negative pole of which is connected to the grid of evacuated tube 31. Bias source 329 normally biases the grid of thyratron 315 sufficiently negatively so that it does not fire and source 333 normally biases the grid of tube 31 negatively to the point of cut off.

Switch 334 may be connected with contact 335 to place coil 62 in series with transformer winding 60, for division, or the switch may be moved into contact with switch contact 336 connected to negative line 96, for multiplication. This switch may be mechanically connected with switch 11 so that both are operated together. The cathode of electronic tube 338 is connected to conductor 337 leading to one terminal of coil 62 and the anode of this tube is connected to positive line 36 which is also connected with contact 339 which is touched by contact 340 when bar 298 is depressed as a result of depression of any multiplier key. Lug 340 is attached to bar 298 but is insulated therefrom and is flexibly connected to a terminal of condenser 341 the other terminal of which is connected to line 337 or to line 96. The grid of tube 338 is connected to the negative pole of a suitable bias battery the positive pole of which is connected to contact 342 against which lug 340 is urged normally. An end of resistor 343 is also connected to contact 342 and the other end of this resistor is connected to condenser 341 and to the cathode of tube 338.

In order to perform a multiplication, assuming that the cathodes of the tubes are energized and that motor 38 is rotating, switch 11 is moved into contact with element 35 and clearing switch 252 is closed for a moment and then is opened. Switch 101 may be opened. As previously described, the closing of switch 252 under these circumstances will cause the relay arms 246, 247, and 248 to conduct current to solenoid 166 and to magnet 250 so that disc 67 is pulled by cable 167 to the position shown with switch arms 74, 75, and 76 touching respective contacts 26, 25, and 24 leading to resistors $20_c$, $20_b$, and $20_a$, respectively. When relay coil 251 is deenergized after a moment, the relay arms 246, and 247 flip back against respective contacts 244 and 245 causing solenoid 234 to pull in its plunger $235_a$ and to stretch spring 237 which urges disc 67 in counter clockwise direction. This disc is held in the position shown until magnet 62 is energized momentarily. The disc moves counter clockwise through an angle corresponding to the spacing of notches 66 each time that magnet 62 is energized to attract arm 64.

When switch 11 is touching contact 35 there is no current passing through solenoid 5 and spring 7 forces numeral sheet 3 back against a stop. Under this condition the multiplier numerals in register with the windows 258 of each row A, B, C, D, E, and F will be as indicated by the heavy numerals "0" to "9" in fragmentary view, Figure 2. These numerals may be indistinct or invisible until an associated lamp 8 is energized, as previously described. It will be observed that the multiplier numerals increase in opposite order from that of the division numerals, the "0" multiplier numerals being associated with the same windows as the "9" division numerals.

As a specific example assume that it is desired to multiply 256 by 384. The "2" key of unit 42, the "5" key of unit 43, and the "6" key of unit 44 are depressed but the zero numeral thyratrons 9, all of which have been fired by a clearing action, remain in conductive condition since no other thyratrons are fired due to the negative bias on thyratron 315 which prevents its firing. Then the "4" key 303 is pressed down until its contact 310 touches its contact 311. When this occurs the positively charged terminal of the associated condenser 314, collected as a result of contact of element 310 with the associated contact 307, is applied to the connected brush 291 and when rotating conductive band 324 bridges the brushes 291 the positively charged condenser terminal is electrically connected with the anode of thyratron 315 through conductor 316, the cathode of this thyratron being connected to the negative terminal of the "4" key condenser 314 by means of connected resistor 332 and line 10. Band 324 makes this circuit connection before brush 130 strikes the first contact of unit 44. The disc 275, rotating in the direction of the arrow, carries contact 318 under brushes 285 preferably shortly before any conductive band 319, 320, or the like, bridges its associated brushes. When contact 318 closes the circuit including brushes 285, current from positive line 36 passes through conductor $285_a$ and through resistor 331 to negative line 10. This current causes a net positive bias on the grid of thyratron 315 and so this tube is fired when contact 318 bridges brushes 285. When thyratron 315 is fired current passing through this tube also passes through resistor 332 to negative line 10 and so provides a net positive bias for tube 31, thereby making it conductive. When this happens the negative lines of all the numeral thyratrons 9 are connected to negative line 10 and so the passage of brush 130 past the contacts of unit 44, which occurs shortly after the positive biasing of tube 31, causes a number of current pulses equal to the number of the depressed key of unit 44 to be passed through relay arm 47, through connected switch arm 76 and through contact 24 to resistor $20_a$, for each revolution of shaft 272 until thyratron 315 is extinguished. The current pulses are directed through this resistor in such manner that the numeral thyratrons corresponding to the numbers 1, 2, 3, 4, 5, and 6 will be fired in succession, then six additional thyratrons for three additional times. This leaves the "4" numeral showing in row A. The arcuate length of band 324 is such that brush 130 sweeps across the contacts of unit 44 four times before the connection between brushes 291 is broken. When this occurs the connection of the positive terminal of the condenser 314 with the anode of thyratron 315, for the "4" multiplier key, is broken and so thyratron 315 is extinguished. Before contact 318 again bridges contacts 285 the contact 328 sweeps across contacts 295 and short circuits the condenser 314 which is in circuit, assuming that the "4" key is still held down so that its element 310 is connected with the associated contact 311. Since the condenser charge is completely drained after contact 328 touches contacts 295 thyratron 315 will not be fired again regardless of how long the "4" key is held down. In order to insure that the multiplier keys will be depressed for intervals sufficient for at least one revolution of the shaft 272 and associated discs, flexible or sliding contacts may be used or time delay means may be associated with the multiplier keys to cause them to maintain contact for adequate periods. These time delay means may comprise dashpots, or other retarding devices or circuits. If desired a resistor $272_a$ may be connected in the condenser drain circuit in order to reduce the short circuit current. This resistor should be of relatively low value.

While brush 130 is in effect adding "6" four times, the "0" thyratron of row A is fired twice and so the two pulses of current in transformer primary winding 89 induce properly phased pulses in associated secondary winding 90 which pulses cause the "1" and "2" thyratrons of row B to be fired in sequence, leaving the "2" numeral showing since any fired thyratron of a row is extinguished when any other thyratron of that row is fired. Therefore two carryovers have occurred from row A to row B and the numerals showing are "2" in row B and "4" in row A. It will be observed that the polarity of pulses induced in the secondaries of the carryover transformers when a "0" thyratron is extinguished is such that a carryover will not occur.

When all the "0" thyratrons for rows A, B, C, D, E, and F are fired at the beginning, or in clearing the machine, the carryover transformers may, if desired, be automatically disconnected to prevent any carryover interference. The "0" thyratrons may be fired in sequence, beginning with row A and going across to row F. This firing may be effected by means of switches or relays 257 which may be temporarily closed when the clearing switch 252 is momentarily closed.

Brush 129 follows brush 130 and puts five pulses for four times into the circuit including unit 43, relay arm 46, switch arm 75, contact 25, and connected resistor $20_b$. Five thyratrons in row B will therefore be fired progressively for four times and row B will indicate "0" plus the previous two carryovers. The final illuminated numeral in row B will therefore be "2." There will also be two carryovers from row B to row C and so row C will show an illuminated "2." Likewise, brush 128 follows brush 129 and puts two pulses for four times into the circuit including unit 42, relay arm 45, switch arm 74, contact 26, and connected resistor $20_c$ so that these thyratrons will be fired progressively for 4×2 or eight times. These eight firings added to the two carryovers already in row C will bring the final illuminated numeral of row C to be "0" and a carryover into row D will occur, leaving the "1" thyratron in that row fired. All of these thyratron firings occur while the "4" multiplier key 303 is depressed, and cease when band 324 has passed brushes 291 and contact 328 has drained the condenser 314 associated with the "4" multiplier key.

As previously stated, brushes 128, 129, and 130 are staggered and are preferably arranged relative to the contacts of units 42, 43, and 44 so that only one brush is in contact with any one contact at a given moment. A storage system for carryovers could be used however and these carryovers could be fed into the thyratron circuits in sequence, while brushes 128, 129, and 130 are not effectively in circuit.

When the "4" multiplier key is released, its spring quickly returns it to starting position with its contact 310 touching its positively charged contact 307 connected to line 36. The condensers 314 are normally maintained in charged condition since they are connected to the positive and negative lines as indicated.

Bias battery 344 of tube 338 normally causes this tube to pass virtually no current from anode to cathode. When switch 334 is thrown to contact 336 for multiplication, one terminal of condenser 341 is connected with negative line 96 and so when bar 298 is depressed by a key the lug 340 is connected with contact 339 and the condenser becomes charged. When the depressed key is released and bar 298 is pulled to its uppermost position by spring 302, the positively charged lug 340 is connected with contact 342 and current from the condenser passes through resistor 343 to negative line 96. This current flow causes a net positive bias to be placed on the grid of tube 338 which then conducts current until the condenser charge has been reduced sufficiently for the normal negative bias from battery 344 to be effective again. The tube then cuts off current to magnet coil 62 which was energized while the condenser was discharging. The current from tube 338 may be sent through the coil of a relay which in turn will control current to coil 62, if desired. It is obvious then that each time a multiplier key is depressed that coil 62 is energized for a short period after the key is released and so pawl 65 is actuated to allow disc 67 to be rotated one step or notch spacing counter clockwise.

Continuing with the multiplication, the "8" multiplier key is next depressed and contact 318 again strikes brushes 285, causing thyratron 315 to fire just before band 320 of disc 277 bridges brushes 287 and so connects the condenser 314 of that key into circuit with the anode of thyratron 315. This thyratron is energized by the condenser until band 320 passes under brushes 287 and so tube 31 is made conductive until the brushes 128, 129, and 130 have swept across the contacts of units 42, 43, and 44 eight times, due to the arcuate length of band 320. After the band runs past the brushes contact 328 bridges brushes 295 and short circuits the condenser 314 associated with the "8" multiplier key. Thyratron 315 is then deprived of anode potential and tube 31 becomes in effect non-conductive again. In the meantime, however, switch arms 74, 75, and 76 were in contact with elements 27, 26, and 25, respectively, connected with respective resistors 20$_d$, 20$_c$, and 20$_b$. Therefore, while tube 31 was conductive, brush 130 put 6 pulses into the B row of thyratrons for eight times or a total of 48 pulses were put into this thyratron row, the thyratrons being fired in succession for each pulse, as previously described. Each time the "0" thyratron of row B was fired a pulse was produced in transformer winding 91 as a result of sudden increase of current in transformer winding 88 and so a carryover into the thyratrons of row C occurred each time the "0" thyratron of row B was fired. Likewise, since the "5" key of unit 43 was depressed there were 8×5 or 40 pulses put into the thyratrons of row C before tube 31 became non-conductive, and each time the "0" thyratron of row C was fired a pulse was induced in winding 92 from the rising pulse in winding 87 and therefore a carryover into the thyratrons of row D occurred, stepping the indication up one number for each pulsing of winding 92. Similarly, since the "2" key of unit 43 was depressed there were 8×2 or 16 pulses put into the thyratrons of row D before tube 31 became non-conductive and a carryover from row D to row E occurred each time the "0" thyratron of row D was fired.

When the "8" multiplier key is released the element 340 is stopped by contact 342 after having touched contact 339 to charge condenser 341, and so tube 338 is temporarily made conductive to energize coil 62 briefly to release pawl 65 and so to allow disc 67 to be rotated one notch spacing counter clockwise as described before. This leaves switch arms 74, 75, and 76 in contact with respective elements 28, 27, and 26 connected to resistors 20$_e$, 20$_d$, and 20$_c$, respectively.

Next, the "3" multiplier key is depressed and band 325 of disc 282 causes tube 31 to be made conductive for a period sufficient for the brushes 128, 129, and 130 to sweep over the contacts of units 42, 43, and 44, respectively, for three times; the contacts 318 and 328 serving the same functions as before. Therefore 3×6 or 18 pulses from unit 44 are put into the thyratrons of row C, and 3×5 or 15 pulses are put into the thyratrons of row D, and 3×2 or 6 pulses are put into the thyratrons of row E. Carryovers occur from row C to row D, from row D to row E, and from row E to row F when the "0" thyratrons of rows C, D, and E are fired. As before, contact 318 initiates the pulsing and contact 328 inactivates tubes 315 and 31, causing the pulsing of the thyratrons to stop. When the "3" multiplier key is released the answer 98, 304 appears in the windows of thyratron rows E, D, C, B, and A. In this case a carryover did not occur from row E to row F.

When the multiplication is completed the clearing switch 252 is momentarily closed thereby resetting disc 67 as described and firing the "0" thyratrons of rows A, B, C, D, E, and F and the "0" thyratrons of unit 168 if these thyratrons happened to be fired in any other order. This unit is not used for multiplication however. The zero multiplier key 345 is mounted as indicated in Figure 10 and has a lug or arm 304 for depressing bar 298 but has no associated condenser or contacts 307, 310, or 311. Depression of this key, due to a "0" in the multiplier, will therefore cause disc 67 to be rotated one notch spacing counter clockwise but the numeral indications in windows of rows A, B, C, D, E, F, will not be changed.

Multiplication with this calculating machine can be as fast as the keys can be pressed, since the speed of rotation of shaft 272 can be made so that the attached discs will be rotated nine times during the interval of depression of a key and its return to starting position. Likewise, the step action of disc 67 may be made quite fast, or electronic switching can be used. The vertical movement of the keys can be made quite short.

In order to perform addition, the switches are connected as for multiplication and the "1" multiplier key is depressed after each number to be added is placed in the keys of units 42, 43, and 44. The addition then appears in the windows of the thyratron rows A, B, C, D, E, F. For subtraction, the same method is used except that the switches are first set for division.

A novel numeral indicator is shown in Figure 11. Arcuate member 346, approximately concentric about window 347, has ten radially aligned bores or tubes 348 in which lenses 349 are pressed, cemented, or fastened by means of rings or the like. Thin discs 350 are suitably fastened in bores 348 and are punched, printed, or otherwise made so that they will form light from lamps 8 into numerals "0" to "9" as indicated. The discs may comprise opaque discs of metal, plastic, or other material with cut-out portions to pass light in the shape of numerals, or they may be made of transparent material with numerals painted or printed on the material. Lamps 8 are mounted in sockets 351 which are fastened to arcuate member 352 having legs 353 which are fastened to cover 354 of the machine by means of screws. Member 346 is fastened to member 352 by means of screws as indicated. Each row of numeral elements in the calculator or other device may be assembled as indicated and there may be as many rows as desired. In this case the rows are arcuately arranged. The cover 354 may be in one piece or it may be an assembly of strips, one for each row or numeral unit.

Cover 354 is made of metal or other opaque material and has a window 355 preferably made of translucent material like ground glass, plastic or the like. The under surface 347 of this window may be curved if desired in order to intercept numeral images to better advantage. The window may be pressed or poured into a cut-out in cover 354, or cemented, or otherwise fastened. The lamps 8 are as previously described and each lamp is suitably connected with a thyratron 9, not shown. Now when any lamp 8 is energized with current it produces light which passes through the opening of its associated mask or screen 350 and accordingly forms a light image of that particular numeral. This image is focused on the under surface of window 355 by the associated lens 349 and appears brightly visible in the window. Since all lenses focus their numeral images on the one window 355 and since the lamps are illuminated only one at a time, for any one row, the numerals in rows A, B, C, D, E, F, for instance, would appear in one line instead of in ten lines as indicated in Figure 1. This is a desirable feature in that the number can be read more easily. The same construction may be used for unit 168. The numeral images could, of course, be focused on the upper translucent surface of window 355, or a hole in the cover could be left so that the numerals of elements 350 could be viewed directly, when illuminated.

Numerous modifications and changes of detail can easily be made by those skilled in the art, without departing from broad principles which I have disclosed. For instance, electro-mechanical numeral indicators or counters may be used in place of electronic counting unit 168. Indicators may be used to show any key which is in the depressed or operative position and suitable circuits may be used with the multiplier keys to provide the desired number of pulses for any depressed key. These circuits may be of the trigger type, or counting circuits such as ring circuits or the like may be included with other components to provide the desired number of pulses when a chosen key is depressed. It is not essential to use the condensers as shown. Furthermore, solenoids may be employed to sweep switch arms over contacts, instead of the rotating brushes as shown in the drawings of the multiplicand key units.

The two sets of numerals for each counting circuit, one for division and one for multiplication, may be placed in parallel lines instead of being in a single line as shown. Then the numerals, or windows, may be shifted sidewise from one set of numerals to the other.

If desired, manual release means may be provided to control the shifting of the switch associated with the counting circuits in case it is desired to substitute manual release for automatic operation. While brushes and associated arcuate contacts are shown for some of the switches or circuit components, it is obvious that cam-operated microswitches or the like can be employed.

Many other obvious changes of detail can readily be made.

What I claim is:

1. In a computer, a plurality of counting circuits including a plurality of current control elements in each said circuit adapted to become effectively electrically conductive in sequence when an associated circuit is intermittently pulsed, numeral indicating means associated with said counting circuits, means for effecting carryover between said counting circuits, pulsing means including a plurality of groups of electrical contacts and a plurality of brushes each of which is movable across one said group of contacts, means for moving said brushes across said groups of contacts, a plurality of keys associated with each said group of contacts and adapted to cause any said group of contacts to provide a number of electrical pulses equal to the numeral associated with any actuated key, switch means for electrically connecting a plurality of said groups of contacts and associated brushes with a plurality of said counting circuits, means including electrical means for operating said switch means sequentially to connect said pulsing means with successsive groups of said counting circuits, a plurality of groups of electrically operated numeral indicators for indicating the number of times said brushes effectively traverse said groups of contacts for each effective position of said switch means, electrical means connecting said switch means and said electrically operated indicators to connect successive groups of said indicators operatively into circuit for successive positions of said switch means, means associated with said brush moving means for connecting said electrically operated numeral indicators operatively into the associated circuit, means associated with said brush moving means for operatively disconnecting said electrically operated numeral indicators from said associated circuit, relay means connecting said pulsing means and said switch means for causing each group of contacts to provide a number of pulses equal to ten minus the number of the key made effective, means associated with said counting circuits and said brush moving means for causing energization of the winding of said relay, and means associated with said brush moving means for causing de-energization of said winding.

2. The device as described in claim 1, and including means associating said counting circuits with said groups of contacts to connect one less contact in circuit for any said group after said relay winding is energized if a carryover occurred in the associated counting circuit during the associated brush traverse which caused the relay winding to be energized.

3. The device as described in claim 1, and including a plurality of other keys associated with said pulsing means and adapted to cause said brushes effectively to sweep over said contacts a number of times corresponding to the numeral associated with the other key made effective.

4. The device as described in claim 1, and including a plurality of other keys associated with said pulsing means, a capacitance associated with each said other key except the zero key, means for charging said capacitances when said other keys are released, electrical means to which the charge of any said capacitance is applied when the associated key is actuated to connect said pulsing means effectively into circuit, and means driven by said brush moving means and connected with any actuated said other key for determining the number of times said brushes will sweep over said contacts while said pulsing means is effectively in circuit.

5. In a computer, means for performing calculations, a sheet-like cover casing member having a plurality of rows of windows therein, another sheet-like member beneath said cover member and having a plurality of rows of numerals aligned with said rows of windows, each said row of numerals having two groups of numerals, one said group increasing from 0 to 9 in one direction and the other said group increasing from 0 to 9 in opposite direction, said other members being movable in direction parallel with said rows to bring all of either said group of numerals simultaneously into register with said windows, and means operatively connecting said calculations performing means and said numerals to cause said numerals to indicate calculations.

6. The device as described in claim 5, and including means for causing said movement.

7. The device as described in claim 5, and including electrical means for causing the movement of said other member, and switch means for controlling current to said electrical means, said means for performing calculations including electrical circuit means for division or subtraction calculations, said switch means also serving to control said electrical circuit means for conditioning said computer for division or subtraction calculations.

8. In an electronic computer, means for performing calculations, means having first groups of numerals for representing division and subtraction calculations and second groups of numerals for representing multiplication and addition calculations, means including electromagnetic means operatively related with said groups for making either said first groups or said second groups effective, electrical switch means connected with said means for performing calculations for setting said computer for addition-multiplication or for subtraction-division, and means operatively connecting said switch means with said electromagnetic means to make said first groups of numerals effective when the computer is set for division or subtraction and for making said second groups of numerals effective when the computer is set for addition or multiplication.

9. In a computer, a plurality of counting circuits, means for pulsing said counting circuits to effect counting in accordance with numerals in calculations, means for indicating numerals associated with said counting circuits, electro-mechanical switch means for connecting said pulsing means with said counting circuits to cause said counting circuits to be pulsed in predetermined order, and means for biasing said switch means selectively to move in either of two directions.

10. The computer as described in claim 9, said biasing means including resilient means for urging said switch means in either direction.

11. The computer as described in claim 9, and including means settable for computations in multiplication or addition and for computations in division or subtraction, and means associating said switch means with said settable means to cause movement of said switch means in direction in accordance with the setting of said settable means.

12. The computer as described in claim 9, and including a plurality of other counting circuits and associated means for effecting division calculations, and associated numeral indicating means for showing the results of division calculations, and electrical circuit means connecting said switch means with said other counting circuits.

13. The computer as described in claim 9, and including a plurality of other counting circuits and associated means for effecting division calculations, and associated numeral indicating means for showing the results of division calculations, and means associating said switch means with said other counting circuits to cause pulsing thereof in sequence in accordance with movements of said switch means.

14. The computer as described in claim 9, and including a plurality of counting means associated with the said switch means and said pulsing means and counting circuits for making effective division calculations, and means for indicating the results of said division calculations.

15. In a computer, a plurality of counting circuits, means for pulsing said counting circuits to effect counting in accordance with numerals in division calculations, means for indicating numerals associated with said counting circuits, switch means for causing said counting circuits to be pulsed in predetermined order, electrical circuit means associated sequentially with a plurality of said counting circuits and becoming effectively energized when the "9" numeral of a counting circuit of higher denominational order than the highest order counting circuit being pulsed by said switch means is indicated, and means associated with said electrical circuit means for causing a plurality of said counting circuits to be pulsed sufficient times to cause the same numerals indicated therein just before indication of said "9" numerals to be again indicated in said plurality of counting circuits, said electrical circuit means also including means to affect the number of effective pulses produced by said pulsing means, and electrical means operated by said switch means for electrically associating with said circuit means a higher denominational counting circuit than the highest denominational counting circuit connected with said switch means.

16. The computer as described in claim 15, and including means associated with said electrical circuit means for causing said switch means to be connected with a different combination of counting circuits after each restoration of indicated numerals after appearance of said "9" numerals.

17. The computer as described in claim 15, said means for pulsing said counting circuits to effect counting in accordance with numerals in calculations including carry-over means associating adjacent counting circuits.

18. In a computer, a plurality of counting circuits including a plurality of current control elements in each said circuit adapted to become effectively electrically conductive in sequence when an associated circuit is intermittently pulsed, numeral indicating means associated with said counting circuits, carryover means operatively connecting said counting circuits to effect carryover from one to another of said counting circuits, first pulsing means including a plurality of groups of electrical contacts and a plurality of brushes each of which is movable across one of said groups of contacts, means for moving said brushes across said groups of contacts, a plurality of keys associated with each said group of contacts and adapted to cause any said group of contacts to provide a number of electrical pulses proportional to the numeral associated with any associated actuated key, electro-mechanical switch means having a plurality of contact elements electrically connected with said counting circuits and a plurality of contact members electrically connected with said carryover means, said switch means including means for electrically connecting a plurality of said groups of contacts and associated brushes with a plurality of said counting circuits, means including electrical means for operating said switch means sequentially to connect said pulsing means with successive groups of said counting circuits, a plurality of electrically operated numeral indicating means for indicating the number of times said brushes effectively traverse said groups of contacts for each effective position of said switch means, electrical circuit means associating said switch means with said electrically operated numeral indicating means effectively to activate successive groups of said indicating means for successive positions of said switch means, means associated with said brush moving means for intermittently pulsing said electrically operated numeral indicating means, and means including contact members associated with said carryover means for operatively disconnecting said intermittently pulsing means.

19. The computer as described in claim 18, said disconnecting means including means associated with said counting circuits for operatively disconnecting said electrically operated numeral indicating means, also including means associated with said brush moving means.

20. The computer as described in claim 18, said electrically operated numeral indicating means including components to cause the first actuating electrical signal for each indicating means to cause zero indication, and to cause the second actuating electrical signal for each indicating means to indicate the numeral 1.

21. The computer as described in claim 18, said disconnecting means including means associated with said carryover means and actuated by energization thereof.

22. The computer as described in claim 18, said disconnecting means including electrical circuit means associated with said carryover means and made effective by energization of at least one said carryover means and said disconnecting means including additional circuit means associated with said brush moving means for causing effective actuation of said disconnecting means.

23. The computer as described in claim 18, said means for operating said switch means including biasing means to cause said switch means to become sequentially connected with successive groups of said counting circuits.

24. The computer as described in claim 18, and including switch means associated with said brush moving means for causing said first pulsing means to be initially connected into circuit only when said brushes are in inoperative position.

25. The computer as described in claim 18, said brushes being phased with respect to said groups of contacts.

26. The computer as described in claim 18, said brushes and said groups of contacts being relatively phased to cause sequential pulsing of said counting circuits.

27. The computer as described in claim 18, and including a plurality of other keys associated with said pulsing means and adapted to cause said brushes effectively to sweep across said contacts a number of times corresponding to the numeral associated with the other key made effective.

28. The computer as described in claim 18, and including a plurality of other keys associated with said first pulsing means, a plurality of capacitances associated with a plurality of said other keys, means for charging said capacitances when said other keys are released, electrical means adapted to be connected with any said capacitance when the associated key is actuated, to connect said first pulsing means effectively with said counting circuits; and means driven by said brush moving means and connected with any actuated said other key for determining the number of times said brushes will sweep across said contacts while said first pulsing means is effectively in circuit.

29. In a computer, a plurality of counting circuits, means for pulsing said counting circuits to effect counting in accordance with numerals in calculations, means for indicating numerals associated with said counting circuits, switch means for electrically connecting said pulsing means selectively with said counting circuits, means including a plurality of keys and a plurality of associated capacitances for affecting the number of pulses supplied by said pulsing means to said counting circuits, means associated with said keys for charging said capacitances upon release of said keys, other means adapted to connect said counting circuits effectively into circuit with said pulsing means, and means associated with said keys to cause an actuated said key to effect electrical connection of its associated capacitance with said other means to cause effective connection thereof with said counting circuits.

30. The computer as described in claim 29, said other means including a current control device.

31. The computer as described in claim 29, said other means including an electronic tube adapted to be connected in circuit with any said capacitance associated with an actuated key.

32. The computer as described in claim 29, said other means including a gaseous electronic tube the anode of which is adapted to receive its potential from any said capacitance associated with an actuated key.

33. The computer as described in claim 29, said other means including a gaseous electronic tube the anode of which is adapted to receive its potential from any said capacitance associated with an actuated key, and an associated electronic tube adapted to be made effectively conductive when said gaseous tube is fired, and including means associated with said pulsing means for causing said gaseous tube to fire while said pulsing means is ineffective.

34. The computer as described in claim 29, said means for affecting the number of pulses supplied by said pulsing means including a plurality of rotary switch means adapted to be connected in circuit with said capacitances to determine the effective intervals thereof, and means for rotating said rotary switch means.

35. The computer as described in claim 29, and means operated by said keys for causing said switch means to connect said pulsing means with a different group of said counting circuits upon actuation of any said key.

36. The computer as described in claim 29, said switch means being operable in steps, and electrical means energized as a result of actuation of any said key for causing a step operation of said switch means.

37. The computer as described in claim 29, and including means for discharging said capacitances.

38. The computer as described in claim 29, said means for affecting the number of pulses supplied by said pulsing means including a plurality of rotary switch means adapted to be connected in circuit with said capacitances to determine the effective intervals thereof, means for causing rotation of said switch means, and means driven by said rotation causing means for discharging said capacitances.

39. In a computer, a plurality of counting circuits, numeral indicating means associated with said counting circuits, means for effecting carryover between said counting circuits, pulsing means for said counting circuits including a plurality of groups of electrical contacts and associated brushes relatively movable thereacross, means for causing relative movement between said brushes and said contacts, a plurality of keys associated with each said group of contacts and adapted to cause any said group of contacts to provide a number of electrical pulses proportional to the numeral associated with any associated actuated key, switch means including means for electrically connecting a plurality of said groups of contacts and associated brushes with a plurality of said counting circuits, means for operating said switch means sequentially to connect said pulsing means with successive groups of said counting circuits, a plurality of other keys having numerals associated therewith, activating circuit means associated with said other keys for making said pulsing means and counting circuits effective upon actuation of a selected one of said other keys, a plurality of relatively movable other brushes and contacts for causing any associated actuated other key to make effective said activating circuit means to cause the first named groups of contacts and associated brushes to apply groups of pulses to said counting circuits a number of times corresponding to the numeral associated with the actuated other key, and means for synchronizing the relative movement of said other brushes and contacts with relative movement of the first named brushes.

40. The computer as described in claim 39, said synchronizing means including means for moving said other brushes and mechanical means associating said brush moving means and said means for moving said other brushes to cause said other brushes to be positionally phased with respect to said first named brushes.

41. The computer as described in claim 39, said relative brush moving means including a shaft for rotating said brushes, a shaft for rotating said other brushes, and means connecting said shafts to cause them to rotate at predetermined ratio of speeds.

42. The computer as described in claim 39, the contacts associated with said other brushes comprising a plurality of conductive curved elements the effective lengths of which vary in proportion to the numerals associated with said other keys.

43. The computer as described in claim 39, and including a shaft for rotating the contacts associated with said other brushes, said rotated contacts comprising a plurality of conductive curved elements the effective lengths of which vary in proportion to the numerals associated with said other keys, means connecting said relative brush moving means and said shaft and adapted to cause said first named brushes relatively to sweep across the associated contacts nine times while the curved contact of maximum length is electrically connected with its associated brush.

44. The computer as described in claim 39, and including means for rotating the contacts associated with said other brushes, said rotated contacts comprising a plurality of conductive curved elements adapted to be in electrical connection with their respective brushes for sufficient intervals to allow said first named brushes to sweep relatively across their respective contacts a number of times equal to the numeral associated with an actuated other key, and means connecting the first named relative brush moving means with said means for rotating said contacts associated with said other brushes to cause said first named relative brush moving means to cause rotation of said contact rotating means at predetermined ratio of speeds.

45. In a computer, a plurality of counting circuits, means for pulsing said counting circuits in accordance with numerals in calculations, switch means for connecting said pulsing means with sequential groupings of said counting circuits, circuit means for affecting the number of effective pulses produced by said pulsing means, and electrical means operated by said switch means for electrically associating with said circuit means a higher denominational counting circuit than the highest denominational counting circuit connected with said switch means.

46. The computer as described in claim 45, said switch means including a rotary element, and means for rotating said element in steps.

47. The computer as described in claim 45, said pulsing means including a plurality of contacts and a plurality of brushes movable thereacross, means for moving said brushes, said circuit means comprising a first circuit made effective by said electrical means and an associated second circuit made effective by said brush moving means at predetermined position thereof relative to said contacts.

48. The computer as described in claim 45, and other circuit means including a plurality of electrical counting means for effecting division calculations and to indicate answers to division calculations, and means operated by said switch means for connecting said electrical counting means sequentially with said other circuit means.

49. In a computer, a plurality of counting circuits, means for pulsing said counting circuits to effect counting in accordance with numerals in calculations, means for effecting carryover between said counting circuits, switch means for electrically connecting said pulsing means selectively with said counting circuits, said pulsing means including circuit means having a plurality of electrical contacts, a plurality of keys having elements adapted normally to cause connection of said contacts in series and adapted to open the circuit means including said contacts upon actuation of a key and leaving effectively in circuit a number of contacts corresponding to the numeral associated with the actuated key, said pulsing means including brush means relatively movable across said contacts, and means for causing relative movement between said brush means and said contacts.

50. The computer as described in claim 49, said pulsing means including a plurality of groups of electrical contacts and a plurality of brush means associated therewith, each said group having at least one said brush means movable relative thereto.

51. The computer as described in claim 49, and including mechanical means for holding actuated keys in actuated position, said mechanical means also including means for releasing an actuated key upon actuation of another key.

52. The computer as described in claim 49, said key elements being tapered and adapted to be stopped by contact with adjacent surfaces of said contacts, and a plurality of springs normally holding said elements against said contacts.

53. The computer as described in claim 49, said electrical contacts being arranged in arcuate manner and said brush means being rotated across said contacts.

54. The computer as described in claim 49, each of a plurality of said keys carrying a tapered conductive element adapted to be brought into contact with a pair of contacts adjacent thereto, and resilient means for causing said elements normally to be held against said contacts.

55. In a computer, a plurality of counting circuits, means for pulsing said counting circuits to effect counting in accordance with numerals in calculations, means for indicating numerals associated with said counting circuits, switch means for electrically connecting said pulsing means selectively with said counting circuits, and means including key means for determining the number of pulses supplied by said pulsing means to each connected counting circuit, said key means including a plurality of capacitances electrically charged upon release of associated keys and the capacitance associated with a depressed key being connected in circuit with electrical means controlling the pulsing of said counting circuits.

References Cited in the file of this patent

UNITED STATES PATENTS

| | | |
|---|---|---|
| 1,370,427 | Giles | Mar. 1, 1921 |
| 1,543,196 | Trinks | June 23, 1925 |
| 2,147,959 | Arbuckle | Feb. 21, 1939 |
| 2,174,047 | Stainbrook | Sept. 26, 1939 |
| 2,288,520 | Geller et al. | June 30, 1942 |
| 2,442,428 | Mumma | June 1, 1948 |
| 2,502,360 | Williams | Mar. 28, 1950 |
| 2,564,575 | Just | Aug. 14, 1951 |
| 2,587,979 | Dickenson | Mar. 4, 1952 |
| 2,595,045 | Desch et al. | Apr. 29, 1952 |
| 2,658,681 | Palmer et al. | Nov. 10, 1953 |
| 2,746,678 | Reynolds | May 22, 1956 |

OTHER REFERENCES

Seely: "Electron-tube Circuits," McGraw-Hill Publishing Co., 1950, pages 68, 69, 76 and 77 relied on.